United States Patent
Tanaka et al.

(10) Patent No.: US 10,661,178 B2
(45) Date of Patent: May 26, 2020

(54) NON-TRANSITORY STORAGE MEDIUM HAVING STORED THEREIN INFORMATION PROCESSING PROGRAM, INFORMATION PROCESSING DEVICE, INFORMATION PROCESSING METHOD, AND INFORMATION PROCESSING SYSTEM FOR POSSESSING A VIRTUAL CHARACTER IN A VIRTUAL SPACE

(71) Applicant: NINTENDO CO., LTD., Kyoto (JP)

(72) Inventors: Wataru Tanaka, Kyoto (JP); Rikuto Yoshida, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 15/939,913

(22) Filed: Mar. 29, 2018

(65) Prior Publication Data

US 2018/0339232 A1 Nov. 29, 2018

(30) Foreign Application Priority Data

May 25, 2017 (JP) .................................. 2017-103878

(51) Int. Cl.
*A63F 13/00* (2014.01)
*A63F 13/69* (2014.01)
(Continued)

(52) U.S. Cl.
CPC .............. *A63F 13/69* (2014.09); *A63F 13/44* (2014.09); *A63F 13/55* (2014.09); *A63F 13/822* (2014.09);
(Continued)

(58) Field of Classification Search
CPC .......... A63F 13/10; A63F 13/44; A63F 13/53; A63F 13/60; A63F 13/63;
(Continued)

(56) References Cited

U.S. PATENT DOCUMENTS

| 7,905,779 B2 * | 3/2011 | Dyke ...................... A63F 13/10 463/30 |
| 2007/0111784 A1 * | 5/2007 | Van Luchene .......... A63F 13/63 463/23 |

(Continued)

FOREIGN PATENT DOCUMENTS

WO   WO 2005/110033   11/2005

OTHER PUBLICATIONS

Schell Games, Enemy Mind, Sep. 25, 2014, https://www.schellgames.com/games/enemy-mind and https://www.youtube.com/watch?v=GviK98Y4L_s (Year: 2014).*

(Continued)

*Primary Examiner* — Justin L Myhr
(74) *Attorney, Agent, or Firm* — Nixon & Vanderhye, P.C.

(57) ABSTRACT

A game system includes an input receiving unit (71) that receives input by a player, an operated character changing unit (722) that changes an object to be assigned as an operated object that is operated in response to the input received with the input receiving unit (71) among objects in a virtual space between a PC and an NPC, and an NPC control unit (723) that controls the NPC using a first control method while the NPC is not assigned as the operated object. During a period until a predetermined condition is satisfied after an object to serve as the operated object is changed from the NPC to the PC by the operated character changing unit (722), the NPC control unit (723) controls the NPC using a second control method different from the first control method.

19 Claims, 20 Drawing Sheets

(51) Int. Cl.
*A63F 13/55* (2014.01)
*A63F 13/44* (2014.01)
*A63F 13/92* (2014.01)
*A63F 13/822* (2014.01)

(52) U.S. Cl.
CPC ....... *A63F 13/92* (2014.09); *A63F 2300/5553* (2013.01)

(58) Field of Classification Search
CPC .......... A63F 2300/303; A63F 2300/638; A63F 2300/64; A63F 2300/646; A63F 13/2145; A63F 13/26; A63F 13/69; A63F 13/92; A63F 2300/1075; A63F 2300/204; A63F 2300/301; A63F 2300/308; A63F 2300/6045
See application file for complete search history.

(56) References Cited

U.S. PATENT DOCUMENTS

| | | | |
|---|---|---|---|
| 2010/0203937 A1* | 8/2010 | Kondo | A63F 13/10 463/4 |
| 2010/0234103 A1* | 9/2010 | Matsumaru | A63F 13/10 463/30 |
| 2011/0319159 A1* | 12/2011 | Kondo | A63F 13/10 463/29 |

OTHER PUBLICATIONS

"Messiah" Game Manual, copyright 1999, Shiny Entertainment, Inc.,,<https://steamcdn-a.akamaihd.net/steam/apps/577980/manuals/messiah-man-eng.pdf?t=1484593778> (Year: 1999).*

* cited by examiner

NON-TRANSITORY STORAGE MEDIUM HAVING STORED THEREIN INFORMATION PROCESSING PROGRAM, INFORMATION PROCESSING DEVICE, INFORMATION PROCESSING METHOD, AND INFORMATION PROCESSING SYSTEM FOR POSSESSING A VIRTUAL CHARACTER IN A VIRTUAL SPACE

CROSS REFERENCE TO RELATED APPLICATION

This nonprovisional application is based on Japanese Patent Application No. 2017-103878 filed with the Japan Patent Office on May 25, 2017, the entire contents of which are hereby incorporated by reference.

FIELD

The present disclosure relates to a non-transitory storage medium having stored therein an information processing program, an information processing device, an information processing method, and an information processing system that performs information processing on an object in a virtual space.

BACKGROUND AND SUMMARY

There is known a game in which a player object and a non-player object are performing motions (actions) in a virtual space. The player object is an object operated in the virtual space in accordance with input from a player inputting an operation with an input device such as a controller. Since the player object in the virtual space serves as a character in most cases, the player object will be referred to as a player character (PC) in the following.

Meanwhile, the non-player object is an object whose motion is controlled by a predetermined control method. Since also the non-player object is typically represented as a character in the virtual space, the non-player object will be referred to as a non-player character (NPC) in the following. For example, the NPC performs a motion according to a predetermined control method, such as moving so as to approach the PC, making an attack toward the PC, performing a motion while staying at a predetermined position in the virtual space, and moving in the virtual space in a certain direction.

Among games in which the PC and the NPC show up in the virtual space, a game is known in which a mechanism that allows the PC to possess the NPC (allows the PC to capture the NPC) is prepared. The NPC possessed by the PC is designed to be controlled in accordance with input from the player. As a result, the player can obtain a game effect that the PC can possess the NPC and manipulate the NPC.

For example, WO 2005/110033 discloses a game that allows a PC to capture an NPC while the PC is in a ghost state and also to leave the NPC. By repeatedly capturing and leaving, the PC can possess multiple NPCs one after another. In this prior art game, while the PC is in a ghost state, control is performed such that the progress of the surrounding time slows down (the movement of the NPC is dulled). In addition, when the PC possesses an NPC that can be possessed and then this possession is released, a dramatic presentation of the PC leaving the NPC is made and the PC appears in the vicinity of the NPC. Here, there are cases where the PC is desired to possess the NPC again immediately after the PC leaves the NPC, such as when the player mistakenly performs a release operation.

Merely for making it easy for the player to possess again, it is only necessary to make the movement of the NPC dull like the above-mentioned prior art. However, if the movement of the NPC is dulled at all times while the PC is able to possess the NPC, the possession of the NPC is always easy and the excitement of the game is lost.

An object of the present disclosure is to provide an information processing device and the like that enable a PC to possess an NPC in a virtual space and easily possess the NPC again while keeping the excitement of a game.

A non-transitory storage medium according to one aspect has stored an information processing program that when executed by at least one processor, causes the at least one processor to: receive input by a player; change an object to serve as an operated object between a first object and a second object among objects in a virtual space, the operated object being operated in response to the input; control the second object using a first control method while the second object does not serve as the operated object; and control the second object using a second control method different from the first control method during a period until a predetermined condition is satisfied after an object to serve as the operated object is changed from the second object to the first object.

With this configuration, the second object immediately after the possession by the first object is released can be controlled differently from a normal state.

The information processing program may further cause the at least one processor to display the first object while the first object serves as the operated object and hide the first object while the second object serves as the operated object.

With this configuration, a dramatic presentation that the first object possesses (captures) the second object can be obtained.

The information processing program may further cause the at least one processor to arrange the first object in a vicinity of the second object when an object to serve as the operated object is changed from the second object to the first object.

With this configuration, a dramatic presentation of the first object leaving the second object is obtained when the possession by the first object is released and it is also made easier for the first object to possess the second object again.

The first control method may be control to move the second object in the virtual space and the second control method is control to stop the second object.

With this configuration, the second object immediately after the possession by the first object is released can be kept stopped.

The first control method may be control to move the second object such that the second object approaches the first object.

With this configuration, the second object immediately after the possession by the first object is released can be controlled so as not to come closer to the first object.

The first control method is control to move the second object such that the second object goes away from the first object.

With this configuration, the second object immediately after the possession by the first object is released can be controlled so as not to go away from the first object.

The first control method may be control to cause the second object to attack the first object and the second control method may be control to stop an attack to the first object by the second object.

With this configuration, the second object immediately after the possession by the first object is released can be controlled so as not to attack the first object.

The first control method may be control to do damage to the first object in a case where the first object makes contact with the second object and the second control method may be control not to do damage to the first object in a case where the first object makes contact with the second object.

With this configuration, the second object immediately after the possession by the first object is released can be controlled so as not to do damage to the first object even when making contact with the first object.

The first control method may be control to arrange the second object at a predetermined position in the virtual space and the second control method may be control to arrange the second object at a position of the second object or in a vicinity of the position when an object to serve as the operated object is changed from the second object to the first object by the operated object changing means.

With this configuration, the second object immediately after the possession by the first object is released can be controlled so as not to return to its initial fixed position.

The information processing program may further cause the at least one processor to change an object to serve as the operated object from the first object to the second object when a third object discharged from the first object serving as the operated object hits the second object.

With this configuration, the operated object can be changed from the first object to the second object by the motion of the first object discharging the third object to hit the second object.

The information processing program may further cause the at least one processor to allow to change an object to serve as the operated object from the first object to the second object during a period until a predetermined condition is satisfied after an object to serve as the operated object is changed from the second object to the first object.

With this configuration, the first object can possess the second object again immediately after leaving the second object.

The information processing program may further cause the at least one processor to, while the second object serves as the operated object, the second object may be placed into a state visually distinguishable from while not serving as the operated object.

With this configuration, it is made easier for the player to recognize, during a play, that the second object is assigned as the operated object.

The information processing program may further cause the at least one processor to control the second object using the first control method after the predetermined condition is satisfied.

With this configuration, after the possession of the second object by the first object is released and the predetermined condition is satisfied, the second object is controlled by a normal control method.

An information processing device according to one aspect comprises at least one processor, the at least one processor is configured to: receive input by a player; change an object to serve as an operated object between a first object and a second object among objects in a virtual space, the operated object being operated in response to the input; and control the second object using a first control method while the second object does not serve as the operated object, wherein during a period until a predetermined condition is satisfied after an object to serve as the operated object is changed from the second object to the first object by the changing, the at least one processor controls the second object using a second control method different from the first control method.

Also with this configuration, the second object immediately after the possession by the first object is released can be controlled differently from the normal state.

An information processing system according to one aspect comprises at least one processor, the at least one processor is configured to: receive input by a player; change an object to serve as an operated object between a first object and a second object among objects in a virtual space being operated in response to the input; and control the second object using a first control method while the second object does not serve as the operated object, wherein during a period until a predetermined condition is satisfied after an object to serve as the operated object is changed from the second object to the first object by the changing, the at least one processor controls the second object using a second control method different from the first control method.

Also with this configuration, the second object immediately after the possession by the first object is released can be controlled differently from the normal state.

An information processing method according to one aspect comprises: controlling a first object in accordance with input received from a player with the first object among objects in a virtual space as an operated object and controlling a second object among the objects in the virtual space using a first control method; changing an object to serve as the operated object from the first object to the second object; changing an object to be assigned as the operated object from the second object to the first object after the changing of the object to serve as the operated object; and controlling the first object in accordance with input received from a player with the first object as the operated object during a period until a predetermined condition is satisfied after the changing of the object to be assigned as the operated object and controlling the second object using a second control method different from the first control method.

Also with this configuration, the second object immediately after the possession by the first object is released can be controlled differently from the normal state.

The foregoing and other objects, features, aspects and advantages of the exemplary embodiments will become more apparent from the following detailed description of the exemplary embodiments when taken in conjunction with the accompanying drawings.

DETAILED DESCRIPTION OF NON-LIMITING EXAMPLE EMBODIMENTS

Hereinafter, an embodiment of the present disclosure will be described with reference to the drawings. The embodiment described below is an example when the present disclosure is carried out and the present disclosure is not limited to a specific configuration described below. When the present disclosure is carried out, a specific configuration according to the embodiment may be appropriately adopted.

Hereinafter, a game system according to an example of the present embodiment will be described. An example of a game system 1 in the present embodiment includes a main body apparatus (information processing apparatus, functioning as a game apparatus main body in the present embodiment) 2, a left controller 3, and a right controller 4. The left controller 3 and the right controller 4 are individually detachable from the main body apparatus 2. Specifically, the game system 1 may be used as an integrated apparatus by attaching each of the left controller 3 and the right controller 4 to the main body apparatus 2. Moreover, in the game system 1, the main body apparatus 2 and the left controller 3 and the right controller 4 can be used separately (refer to FIG. 2). In the following, a hardware configuration of the game system 1 according to the present embodiment will be described, and the control of the game system 1 of the present embodiment will then be described.

Figure 1:
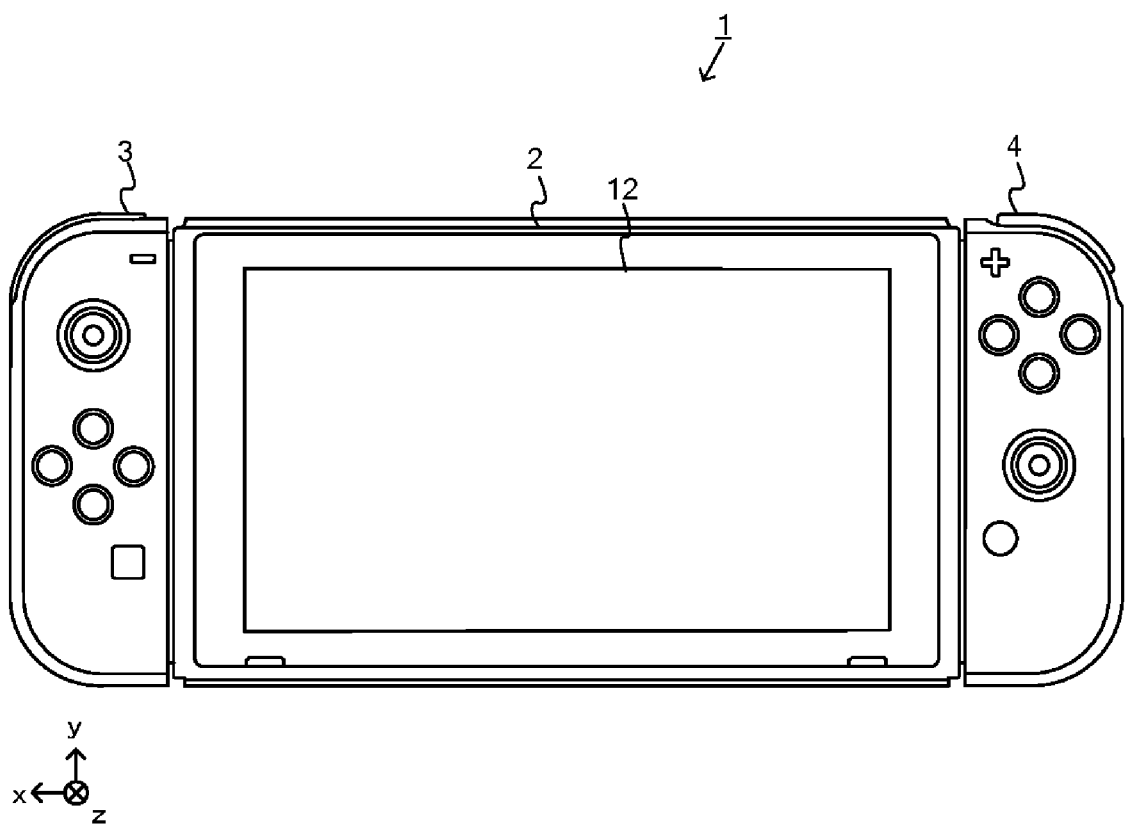
FIG. 1 is a diagram illustrating an example of a state in which a left controller and a right controller are attached to a main body device.

FIG. 1 is a diagram illustrating an example of a state in which the left controller 3 and the right controller 4 are attached to the main body apparatus 2. As illustrated in FIG. 1, the left controller 3 and the right controller 4 are attached to and integrated with the main body apparatus 2. The main body apparatus 2 is an apparatus configured to execute various types of processing (for example, game processing) in the game system 1. The main body apparatus 2 includes a display 12. Each of the left controller 3 and the right controller 4 is an apparatus including an operation unit used by a user to perform input.

Figure 2:
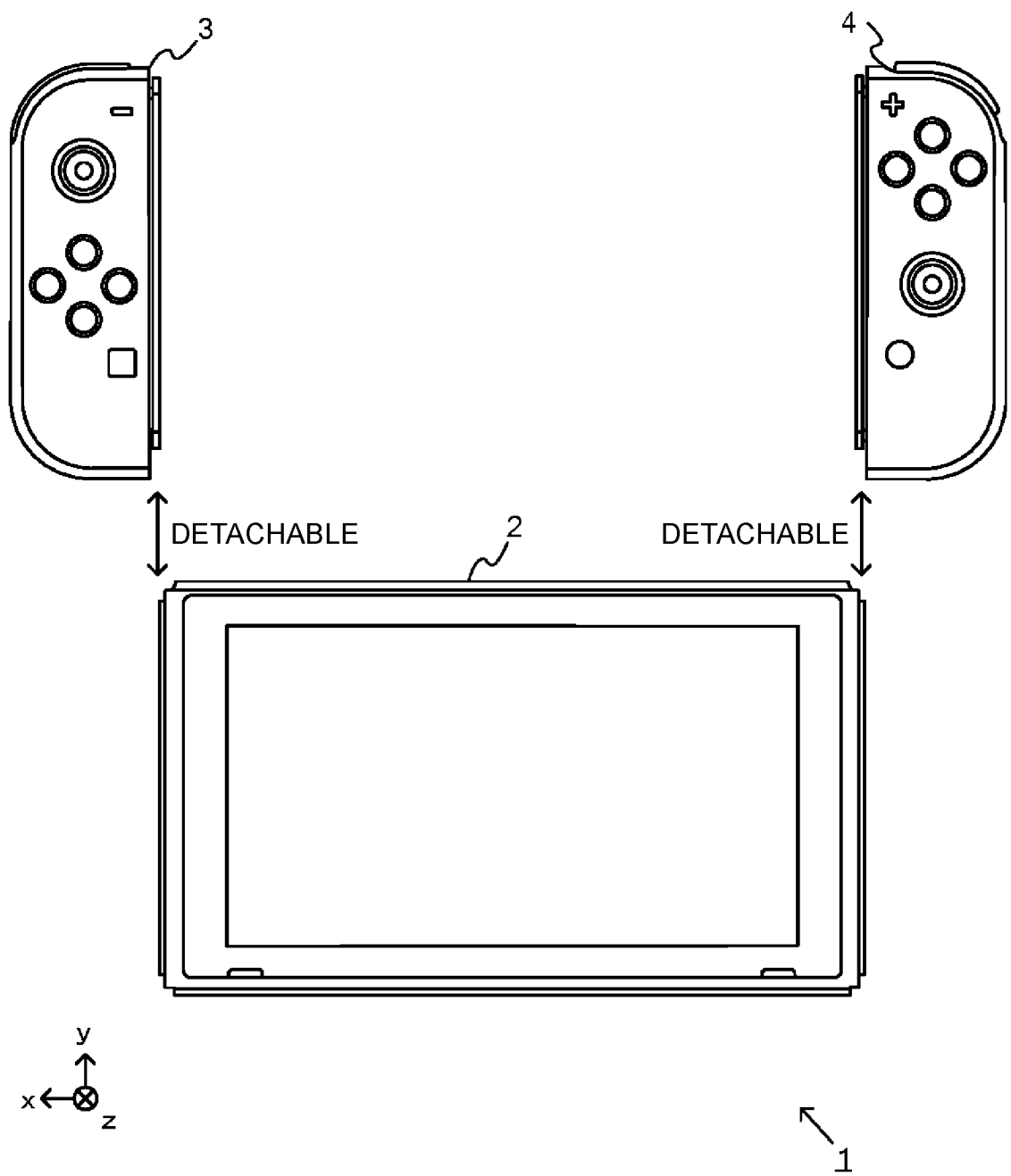
FIG. 2 is a diagram illustrating an example of a state in which both of the left controller and the right controller are removed from the main body device.

FIG. 2 is a diagram illustrating an exemplary state in which the left controller 3 and the right controller 4 are removed from the main body apparatus 2. As illustrated in FIGS. 1 and 2, the left controller 3 and the right controller 4 are detachable from the main body apparatus 2. In the following description, the left controller 3 and the right controller 4 will be collectively referred to as the "controller" in some cases.

Figure 3:
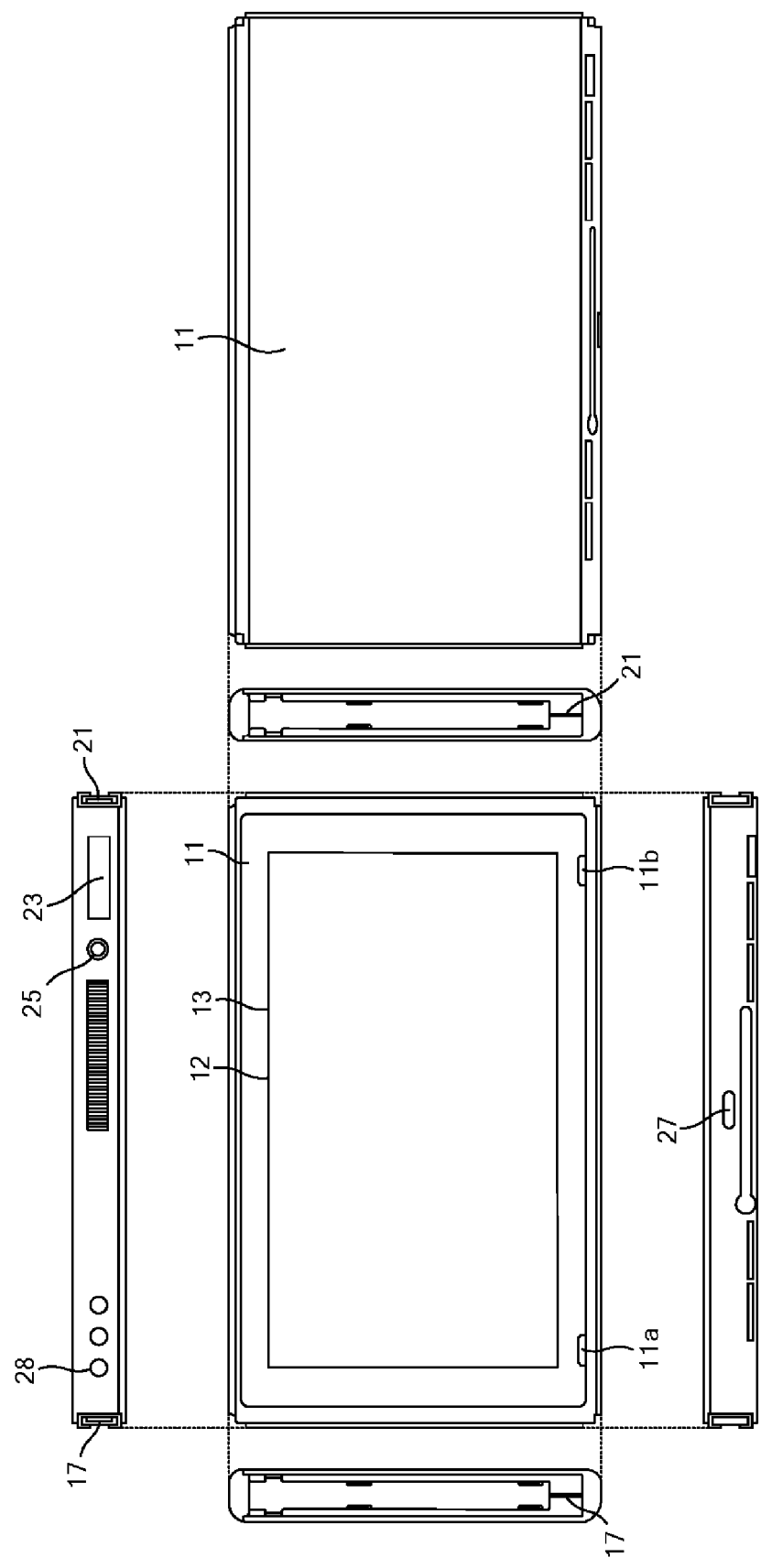
FIG. 3 is a six-sided view illustrating an example of the main body device.

FIG. 3 is a six-sided view illustrating an example of the main body apparatus 2. As illustrated in FIG. 3, the main body apparatus 2 includes a substantially plate-like housing 11. In the present embodiment, a main surface of the housing 11 (in other words, a front-side surface, that is, the surface on which the display 12 is provided) is substantially rectangular in shape.

The shape and size of the housing 11 are arbitrary. For example, the housing 11 may be formed in a mobile size. Moreover, the main body apparatus 2 alone and the integrated apparatus in which the left controller 3 and the right controller 4 are attached to the main body apparatus 2 may be a mobile apparatus. The main body apparatus 2 or the integrated apparatus may be a handheld apparatus. Alternatively, the main body apparatus 2 or the integrated apparatus may be a portable apparatus.

As illustrated in FIG. 3, the main body apparatus 2 includes a display 12 provided on the main surface of the housing 11. The display 12 displays an image generated by the main body apparatus 2. In the present embodiment, the display 12 is a liquid crystal display (LCD). Note that the display 12 may be any type of display apparatus.

The main body apparatus 2 includes a touch panel 13 on a screen of the display 12. In the present embodiment, the touch panel 13 uses a system capable of multi-touch input (for example, capacitance system). Note that the touch panel 13 may use any system, for example, a system capable of single touch input (for example, resistive film system).

The main body apparatus 2 includes a speaker (that is, a speaker 88 illustrated in FIG. 6) inside the housing 11. As illustrated in FIG. 3, speaker holes 11a and 11b are formed on the main surface of the housing 11. The output sound of the speaker 88 is output from each of the speaker holes 11a and 11b.

Moreover, the main body apparatus 2 includes a left side terminal 17 as a terminal used by the main body apparatus 2 to perform wired communication with the left controller 3, and a right side terminal 21 used by the main body apparatus 2 to perform wired communication with the right controller 4.

As illustrated in FIG. 3, the main body apparatus 2 includes a slot 23. The slot 23 is provided on the upper side surface of the housing 11. The slot 23 has a shape that enables a predetermined type of storage medium to be attached. The storage medium is, for example, a storage medium (for example, a dedicated memory card) dedicated to the game system 1 and the information processing apparatus of the same type as the game system 1. The predetermined type of storage medium is used for storing, for example, one or both of the data (for example, saved data of an application) used in the main body apparatus 2 and a program (for example, an application program) executed in the main body apparatus 2. Moreover, the main body apparatus 2 includes a power button 28.

The main body apparatus 2 includes a lower terminal 27. The lower terminal 27 is a terminal used by the main body apparatus 2 to communicate with a cradle. In the present embodiment, the lower terminal 27 is a USB connector (more specifically, a female connector). When the integrated apparatus or the main body apparatus 2 alone is mounted on the cradle, the game system 1 can display an image generated and output by the main body apparatus 2, on the stationary monitor. Moreover, in the present embodiment, the cradle has a function of charging the above-described integrated apparatus or the main body apparatus 2 alone mounted on the cradle. The cradle also has a function of a hub apparatus (specifically, a USB hub).

Figure 4:
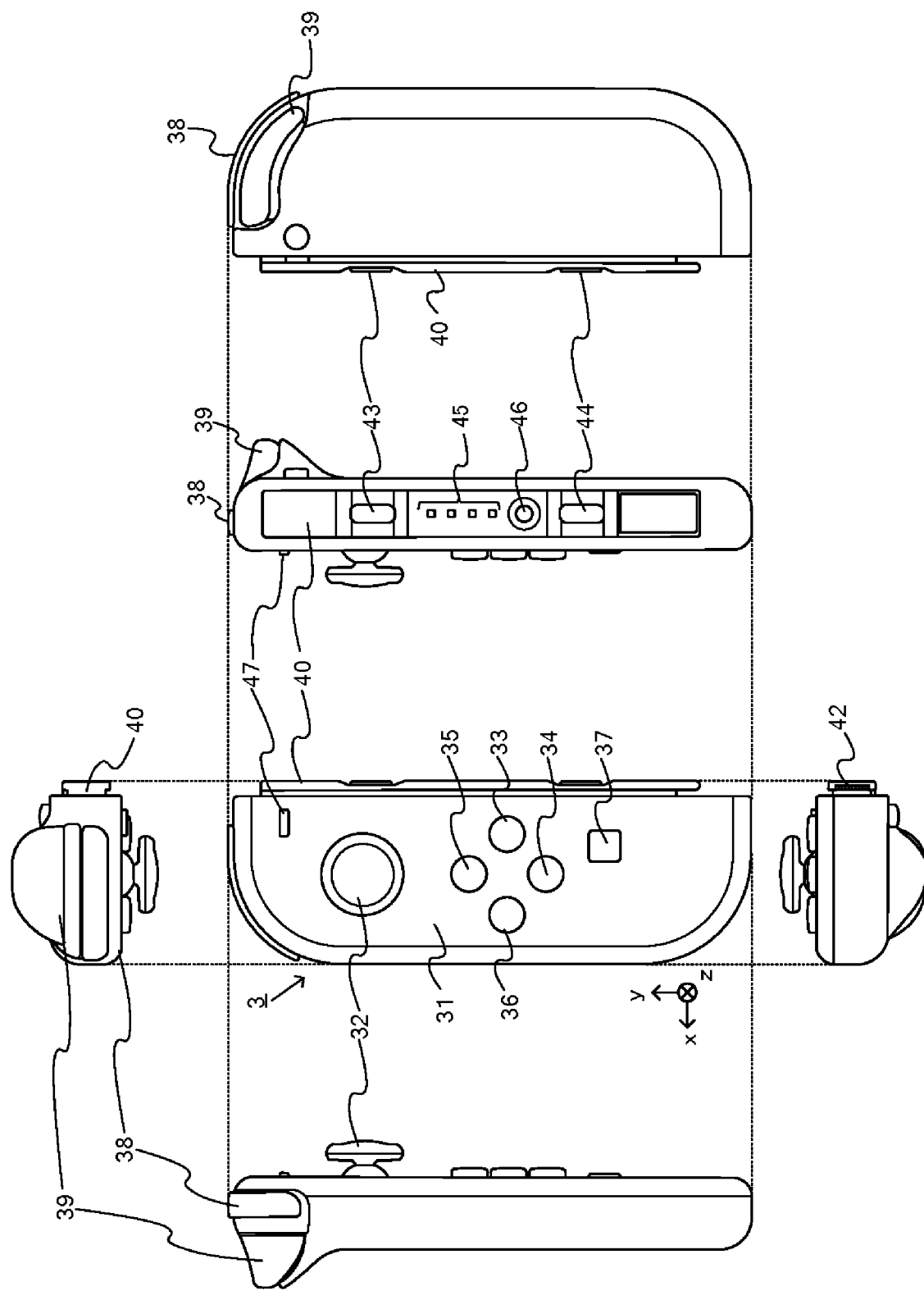
FIG. 4 is a six-sided view illustrating an example of the left controller.

FIG. 4 is a six-sided view illustrating an example of the left controller 3. As illustrated in FIG. 4, the left controller 3 includes a housing 31. In the present embodiment, the housing 31 has a vertically long shape, that is, a long shape in the vertical direction (that is, in the y-axis direction illustrated in FIGS. 1 and 4). The left controller 3 can also be held in a vertically long orientation in a state detached from the main body apparatus 2. The housing 31 has a shape and size that can be held with one hand, in particular with the left hand, in a case of being held in a vertically long orientation. Moreover, the left controller 3 can also be held in a landscape orientation. In the case where the left controller 3 is held in a landscape orientation, it may be held with both hands.

The left controller 3 includes an analog stick 32. As illustrated in FIG. 4, the analog stick 32 is provided on the main surface of the housing 31. The analog stick 32 can be used as a direction input unit capable of inputting a direction. By inclining the analog stick 32, the user can input a direction corresponding to the inclination direction (and input with a size corresponding to the inclined angle). Instead of the analog stick, the left controller 3 may include a cross key or a slide stick capable of slide input may be provided as the direction input unit. Moreover, an input by pressing the analog stick 32 is possible in the present embodiment.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Furthermore, the left controller 3 includes a recording button 37 and a − (minus sign) button 47. The left controller 3 includes a first L button 38 and a ZL button 39 on the upper left of the side surface of the housing 31. The left controller 3 also includes a second L button 43 and a second R button 44 on the side surface of the housing 31, the side to be attached when it is attached to the main body apparatus 2. These operation buttons are used to give instructions according to various programs (for example, OS program and application program) executed by the main body apparatus 2.

Moreover, the left controller 3 includes a terminal 42 used by the left controller 3 to perform wired communication with the main body apparatus 2.

Figure 5:
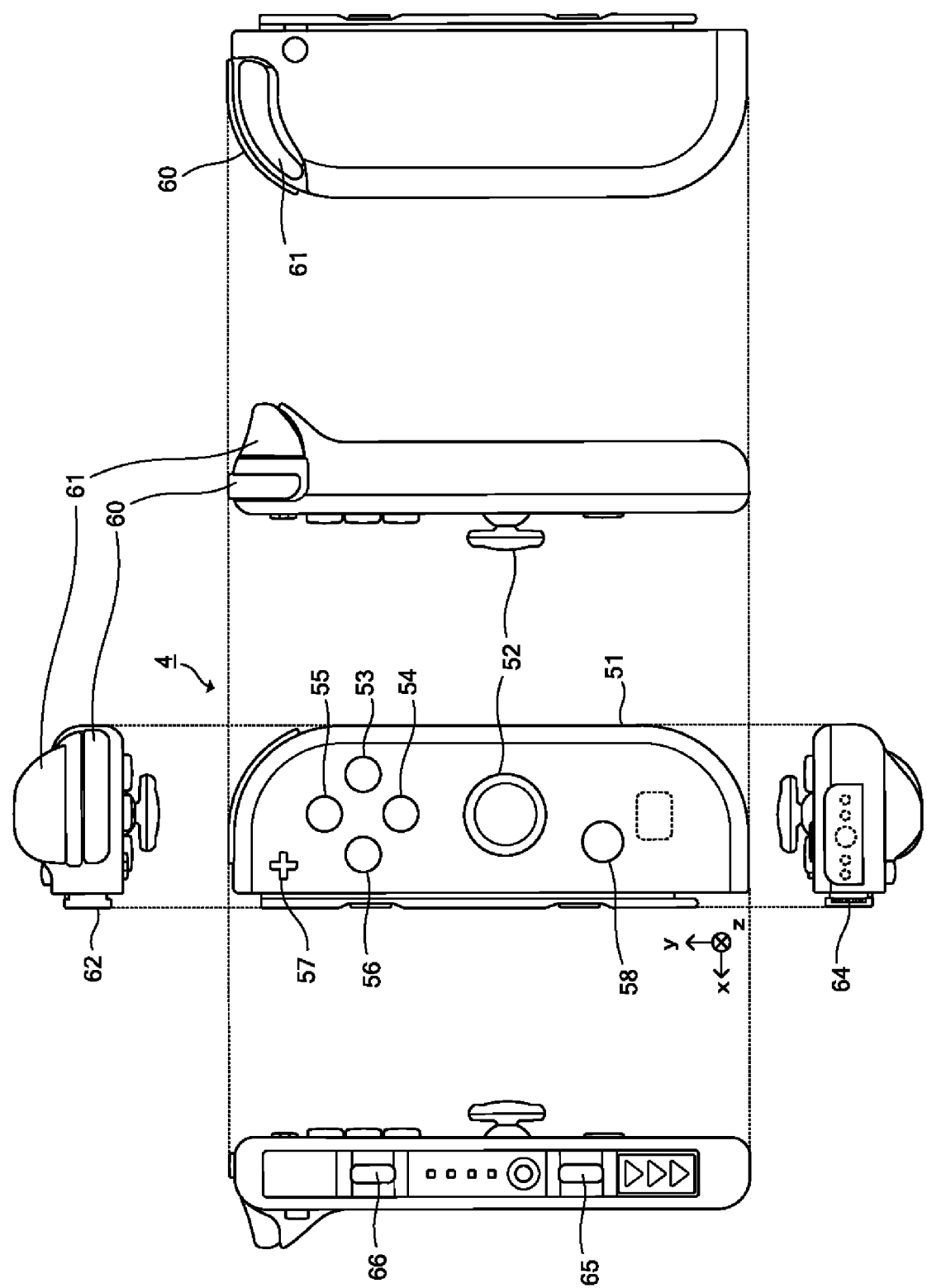
FIG. 5 is a six-sided view illustrating an example of the right controller.

FIG. 5 is a six-sided view illustrating an example of the right controller 4. As illustrated in FIG. 5, the right controller 4 includes a housing 51. In the present embodiment, the housing 51 has a vertically long shape, that is, a long shape in the vertical direction. The right controller 4 can also be held in a vertically long orientation in a state detached from the main body apparatus 2. The housing 51 has a shape and size that can be held with one hand, in particular with the right hand, in a case of being held in a vertically long orientation. Moreover, the right controller 4 can also be held in a landscape orientation. In the case where the right controller 4 is held in a landscape orientation, it may be held with both hands.

Similarly to the left controller 3, the right controller 4 includes an analog stick 52 as a direction input unit. In the present embodiment, the analog stick 52 has the same configuration as the analog stick 32 of the left controller 3. Instead of the analog stick, the right controller 4 includes a cross key or a slide stick capable of inputting a slide or the like may be provided. Similarly to the left controller 3, the right controller 4 includes four operation buttons 53 to 56 (specifically, A button 53, B button 54, X button 55, and Y button 56) on the main surface of the housing 51. Furthermore, the right controller 4 includes a + (plus sign) button 57 and a home button 58. The right controller 4 also includes a first R button 60 and a ZR button 61 on the upper right of the side surface of the housing 51. Similarly to the left controller 3, the right controller 4 includes a second L button 65 and a second R button 66.

Moreover, the right controller 4 includes a terminal 64 used by the right controller 4 to perform wired communication with the main body apparatus 2.

Figure 6:
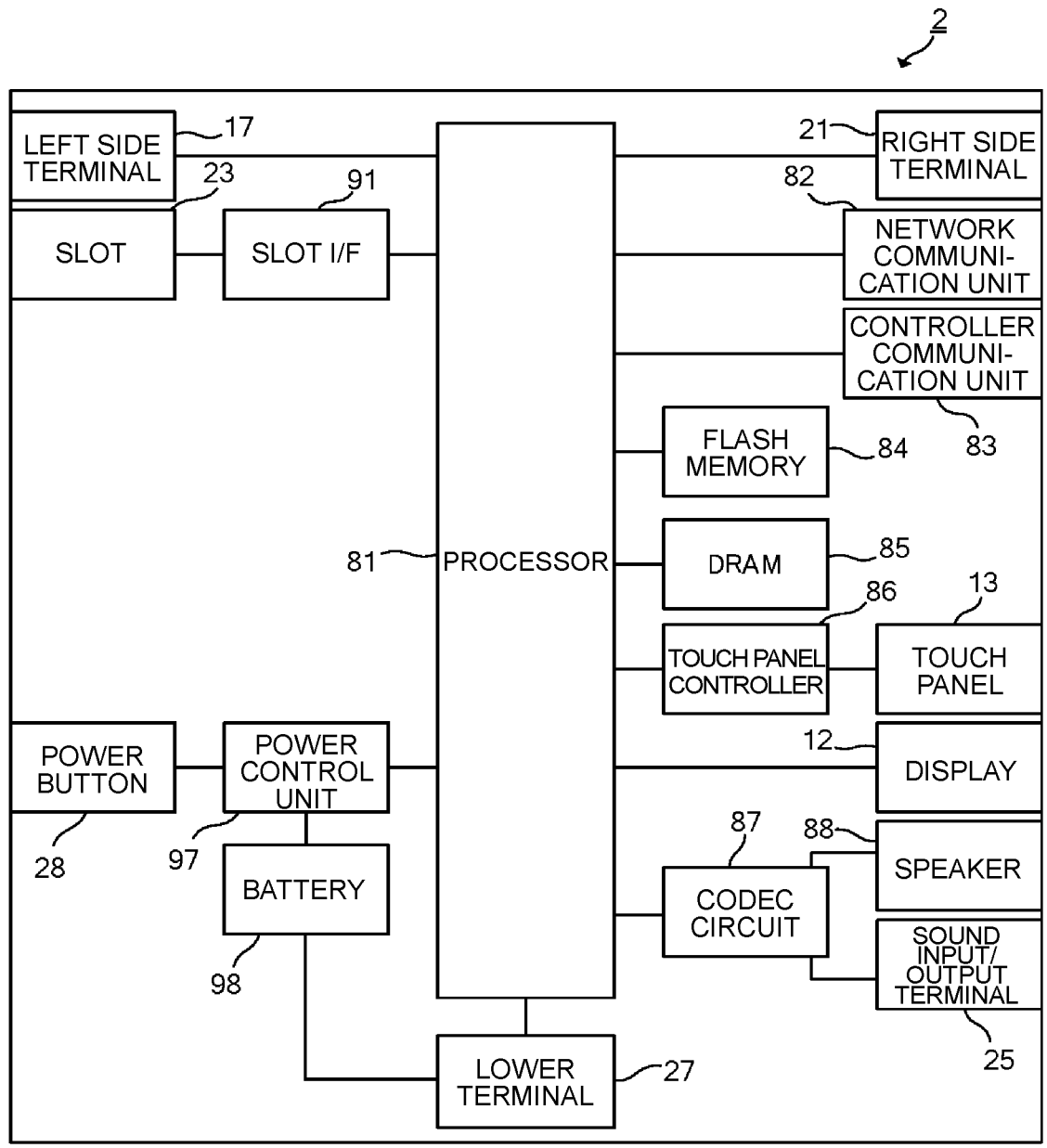
FIG. 6 is a block diagram illustrating an example of the internal configuration of the main body device.

FIG. 6 is a block diagram illustrating an example of the internal configuration of the main body apparatus 2. In addition to the configuration illustrated in FIG. 3, the main body apparatus 2 includes individual components 81 to 91, 97 and 98 illustrated in FIG. 6. Some of these components 81 to 91, 97 and 98 may be mounted on an electronic circuit board as electronic components and stored in the housing 11.

The main body apparatus 2 includes a processor 81. The processor 81 is an information processing unit that executes various types of information processing to be executed in the main body apparatus 2, and may be constituted only by a CPU (Central Processing Unit), for example, or it may be constituted by a system-on-a-chip (SoC) including a plurality of functions such as a CPU function and a GPU (Graphics Processing Unit) function. The processor 81 executes various types of information processing by executing an information processing program (for example, a game program) stored in a storage unit (specifically, an internal storage medium such as a flash memory 84 or an external storage medium attached to the slot 23, or the like).

The main body apparatus 2 includes the flash memory 84 and a dynamic random access memory (DRAM) 85 as an exemplary internal storage medium incorporated in oneself. The flash memory 84 and the DRAM 85 are connected to the processor 81. The flash memory 84 is mainly used for storing various data (or may be programs) stored in the main body apparatus 2. The DRAM 85 is a memory used for temporarily storing various data used in information processing.

The main body apparatus 2 includes a slot interface (hereinafter abbreviated as "I/F") 91. The slot I/F 91 is connected to the processor 81. The slot I/F 91 is connected to the slot 23, and performs reading and writing of data from/into a predetermined type of storage medium (for example, a dedicated memory card) attached to the slot 23 in accordance with an instruction of the processor 81.

The processor 81 appropriately reads or writes data to and from the flash memory 84 and the DRAM 85 and the individual storage media, thereby executing the above-described information processing.

The main body apparatus 2 includes a network communication unit 82. The network communication unit 82 is connected to the processor 81. The network communication unit 82 performs communication (specifically, wireless communication) with an external apparatus via a network. In the present embodiment, the network communication unit 82 communicates with an external apparatus using a wireless LAN connection with a method conforming to the Wi-Fi standard as a first communication mode. Moreover, the network communication unit 82 performs wireless communication with another main body apparatus 2 of the same type by a predetermined communication method (for example, communication based on a proprietary protocol or infrared communication) as a second communication mode. Note that the wireless communication according to the second communication mode is capable of performing wireless communication with another main body apparatus 2 arranged in a closed local network area and achieves a function enabling "local communication" of transferring data by directly communicating among a plurality of main body apparatuses 2.

The main body apparatus 2 includes a controller communication unit 83. The controller communication unit 83 is connected to the processor 81. The controller communication unit 83 performs wireless communication with one or both of the left controller 3 and the right controller 4. While it is allowable to use any communication system between the main body apparatus 2 and the left controller 3 and between the main body apparatus 2 and the right controller 4, the present embodiment uses communication conforming to Bluetooth (registered trademark) standard to be used for communication by the controller communication unit 83 with the left controller 3 and with the right controller 4.

The processor 81 is connected to the left side terminal 17, the right side terminal 21, and the lower terminal 27 described above. In a case of performing wired communication with the left controller 3, the processor 81 transmits data to the left controller 3 via the left side terminal 17 and receives operation data from the left controller 3 via the left side terminal 17. Moreover, in a case of performing wired communication with the right controller 4, the processor 81 transmits data to the right controller 4 via the right side terminal 21 and receives operation data from the right controller 4 via the right side terminal 21. Moreover, in a case of communicating with the cradle, the processor 81 transmits data to the cradle via the lower terminal 27. In this manner, in the present embodiment, the main body apparatus 2 can perform both wired communication and wireless communication with the left controller 3 and the right controller 4. Moreover, in a case where the integrated apparatus including the left controller 3 and the right controller 4 attached to the main body apparatus 2 is attached to the cradle or where the main body apparatus 2 alone is attached to the cradle, the main body apparatus 2 can output data (for example, image data and sound data) to the stationary monitor, or the like, via the cradle.

Note that the main body apparatus 2 can communicate simultaneously (in other words, in parallel) with a plurality of left controllers 3. Moreover, the main body apparatus 2 can communicate simultaneously (in other words, in parallel) with a plurality of right controllers 4. This makes it possible to perform inputs by the user into the main body apparatus 2 using the plurality of left controllers 3 and the plurality of right controllers 4.

The main body apparatus 2 includes a touch panel controller 86 as a circuit for controlling the touch panel 13. The touch panel controller 86 is connected between the touch panel 13 and the processor 81. The touch panel controller 86 generates, for example, data indicating a position of input of a touch input on the basis of a signal from the touch panel 13 and outputs the generated data to the processor 81.

Moreover, the display 12 is connected to the processor 81. The processor 81 displays on the display 12 one or both of the generated image (for example, by executing the above information processing) and the image obtained from the outside.

The main body apparatus 2 includes a coder/decoder (codec) circuit 87 and speakers (specifically, a left speaker and a right speaker) 88. The codec circuit 87 is connected to the speaker 88 and a sound input/output terminal 25, and is also connected to the processor 81. The codec circuit 87 is a circuit for controlling input and output of sound data to and from the speaker 88 and the sound input/output terminal 25.

The main body apparatus 2 includes a power control unit 97 and a battery 98. The power control unit 97 is connected to the battery 98 and the processor 81. Although not illustrated, the power control unit 97 is connected to each of portions of the main body apparatus 2 (specifically, each of portions receiving the power supply of the battery 98, the left side terminal 17, and the right side terminal 21). The power control unit 97 controls power supply from the battery 98 to each of the above-described portions on the basis of a command from the processor 81.

Moreover, the battery 98 is connected to the lower terminal 27. In a case where an external charging apparatus (for example, a cradle) is connected to the lower terminal 27 and the power is supplied to the main body apparatus 2 via the lower terminal 27, the supplied power is charged in the battery 98.

Figure 7:
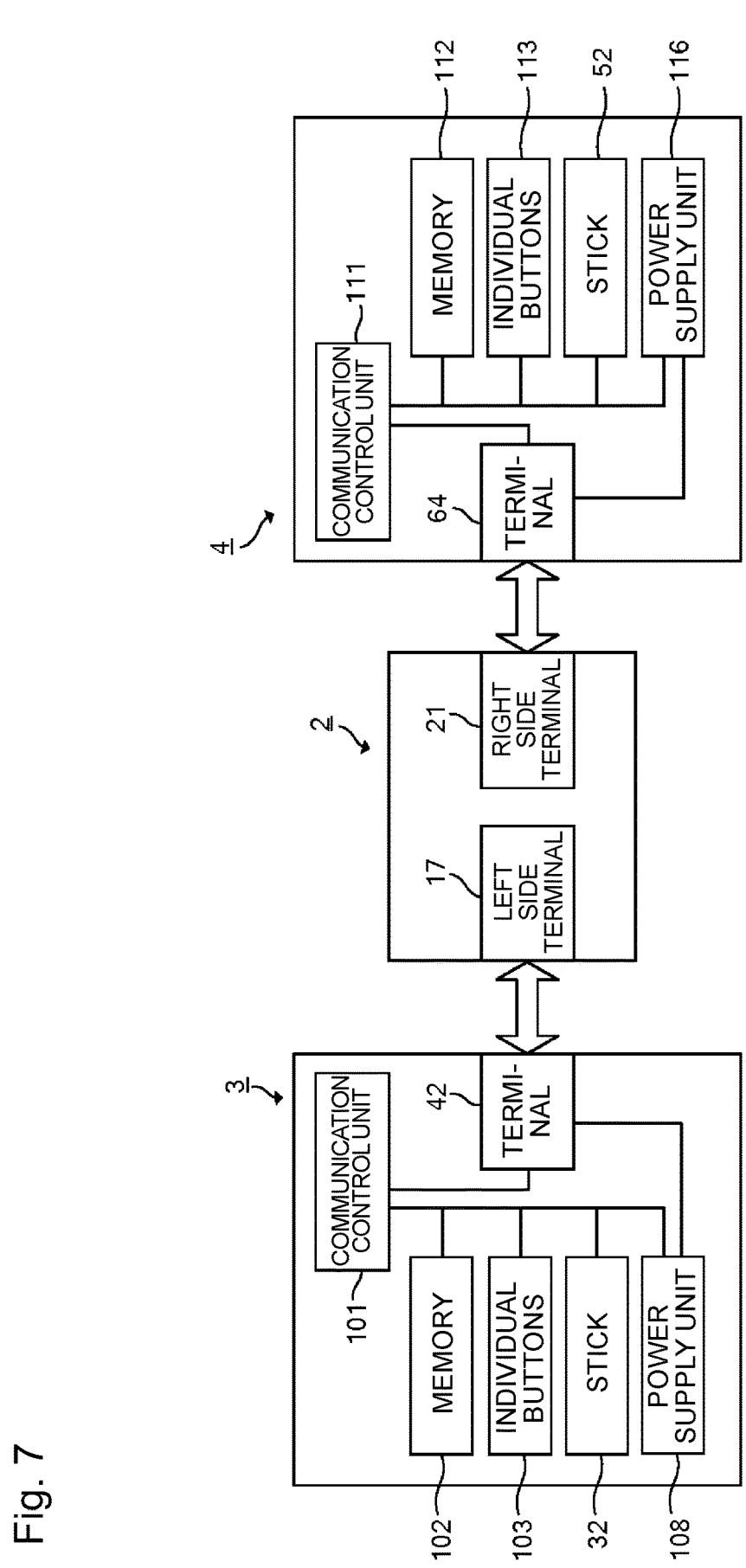
FIG. 7 is a block diagram illustrating an example of the internal configuration of the main body device, the left controller, and the right controller.

FIG. 7 is a block diagram illustrating an exemplary internal configuration of the main body apparatus 2, the left controller 3, and the right controller 4. Note that details of the internal configuration related to the main body apparatus 2 are omitted in FIG. 7 because they are illustrated in FIG. 6.

The left controller 3 includes a communication control unit 101 that communicates with the main body apparatus 2. As illustrated in FIG. 7, the communication control unit 101 is connected to each of components including the terminal 42. In the present embodiment, the communication control unit 101 can communicate with the main body apparatus 2 by both wired communication via the terminal 42 and wireless communication not via the terminal 42. The communication control unit 101 controls a communication method performed by the left controller 3 on the main body apparatus 2. That is, in a case where the left controller 3 is attached to the main body apparatus 2, the communication control unit 101 communicates with the main body apparatus 2 via the terminal 42. In contrast, in a case where the left controller 3 is detached from the main body apparatus 2, the communication control unit 101 performs wireless communication with the main body apparatus 2 (specifically, the controller communication unit 83). Wireless communication between the controller communication unit 83 and the communication control unit 101 is performed in accordance with the Bluetooth (registered trademark) standard, for example.

Moreover, the left controller 3 includes a memory 102 such as a flash memory. The communication control unit 101 is formed with, for example, a microcomputer (also referred to as a microprocessor) and executes various types of processing by executing firmware stored in the memory 102.

The left controller 3 includes individual buttons 103 (specifically, buttons 33 to 39, 43, 44, 46, and 47). The left controller 3 also includes the analog stick 32 (described as "stick" in FIG. 7). Individual buttons 103 and the analog stick 32 repeatedly output information related to the operation performed on oneself to the communication control unit 101 at an appropriate timing.

The communication control unit 101 obtains information related to the input (specifically, information related to the operation or a detection result by the sensor) from each of input units (specifically, the individual buttons 103, the analog stick 32, the sensors 104 and 105). The communication control unit 101 transmits the operation data including the obtained information (or the information obtained by performing predetermined processing on the obtained information) to the main body apparatus 2. The operation data is repeatedly transmitted at a rate of once every predetermined time. The interval at which the information related to the input is transmitted to the main body apparatus 2 may either be the same or not the same for individual input units.

With transmission of the above-described operation data to the main body apparatus 2, the main body apparatus 2 can obtain the input performed onto the left controller 3. That is, the main body apparatus 2 can distinguish the operation onto the individual buttons 103 and the analog stick 32 on the basis of the operation data.

The left controller 3 includes a power supply unit 108. In the present embodiment, the power supply unit 108 includes a battery and a power control circuit. Although not illustrated, the power control circuit is connected to the battery and is also connected to each of portions of the left controller 3 (specifically, each of portions receiving power supply of the battery).

As illustrated in FIG. 7, the right controller 4 includes a communication control unit 111 that communicates with the main body apparatus 2. The right controller 4 also includes a memory 112 connected to the communication control unit 111. The communication control unit 111 is connected to each of the components including the terminal 64. The communication control unit 111 and the memory 112 have the functions similar to the functions of the communication control unit 101 and the memory 102 of the left controller 3. Accordingly, the communication control unit 111 can communicate with the main body apparatus 2 in both wired communication via the terminal 64 and wireless communication not via the terminal 64 (specifically, communication conforming to the Bluetooth (registered trademark) standard) and controls the communication method performed by the right controller 4 onto the main body apparatus 2.

The right controller 4 includes individual input units similar to the individual input units of the left controller 3. Specifically, the right controller 4 includes the individual buttons 113 and the analog stick 52. Each of these input units has functions similar to individual input units of the left controller 3 and operates in the similar manner.

The right controller 4 includes a power supply unit 118. The power supply unit 118 has functions similar to the functions of the power supply unit 108 of the left controller 3 and operates in the similar manner.

Figure 8:
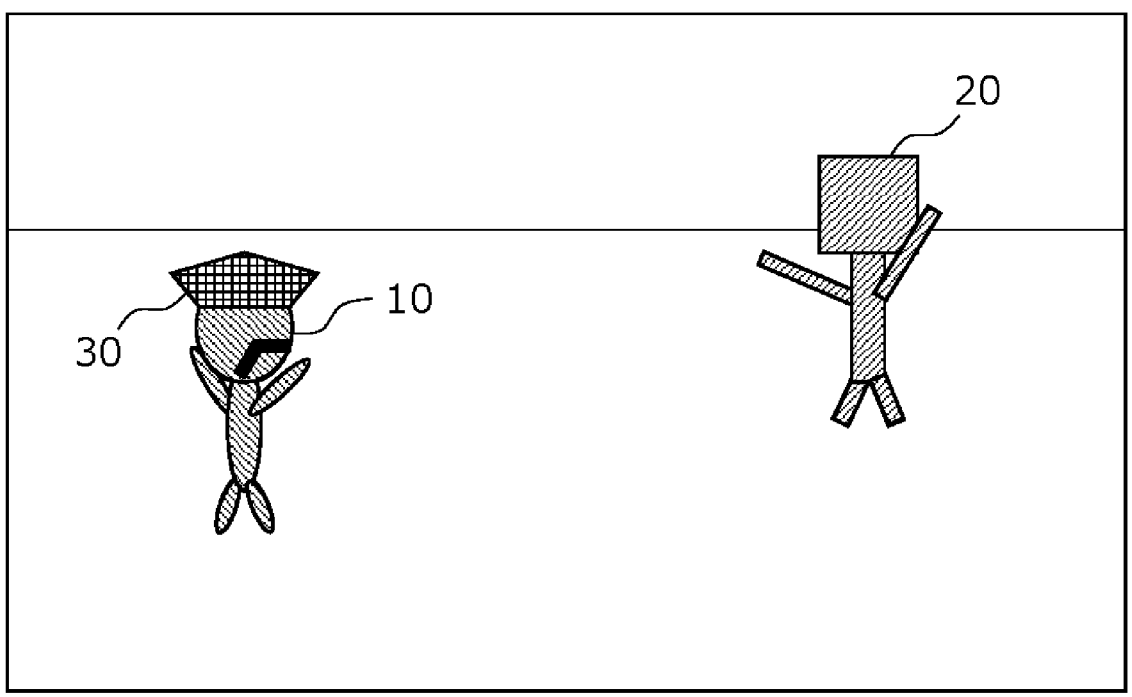
FIG. 8 is a diagram illustrating an example of a game screen.

Next, the control of the game system 1 of the present embodiment will be described. FIGS. 8 to 11 are diagrams illustrating examples of game screens. An outline of a game executed in the game system 1 will be described with reference to FIGS. 8 to 11. As illustrated in FIG. 8, in this game, a PC 10 and an NPC 20 are set in a virtual space. Note that, although the examples in FIGS. 8 to 11 simply illustrate one NPC 20, a plurality of NPCs 20 may be set in the virtual space. The PC 10 wears a hat object 30.

By operating the controller, a player can move the PC 10 in the virtual space and cause the PC 10 to execute various actions. One of actions executable by the PC 10 is a motion of throwing the hat object 30 (hat throwing motion). In the hat throwing motion, the hat object 30 attached to the head of the PC 10 is discharged from the PC 10 to proceed by a predetermined distance and then returns to the PC 10 to be attached again to the head of the PC 10.

The NPC 20 moves in accordance with a game program and, when an action execution condition is satisfied, executes a corresponding action. Actions executed by the NPC 20 include a motion of moving so as to approach the PC 10, a motion of moving so as to go away from the PC 10, a motion of attacking the PC 10, and a motion of doing damage to the PC 10 that has made contact therewith. Attacks include a direct attack against the PC 10 and an attack that throws a flying tool like a hammer to the PC 10.

Figure 9:
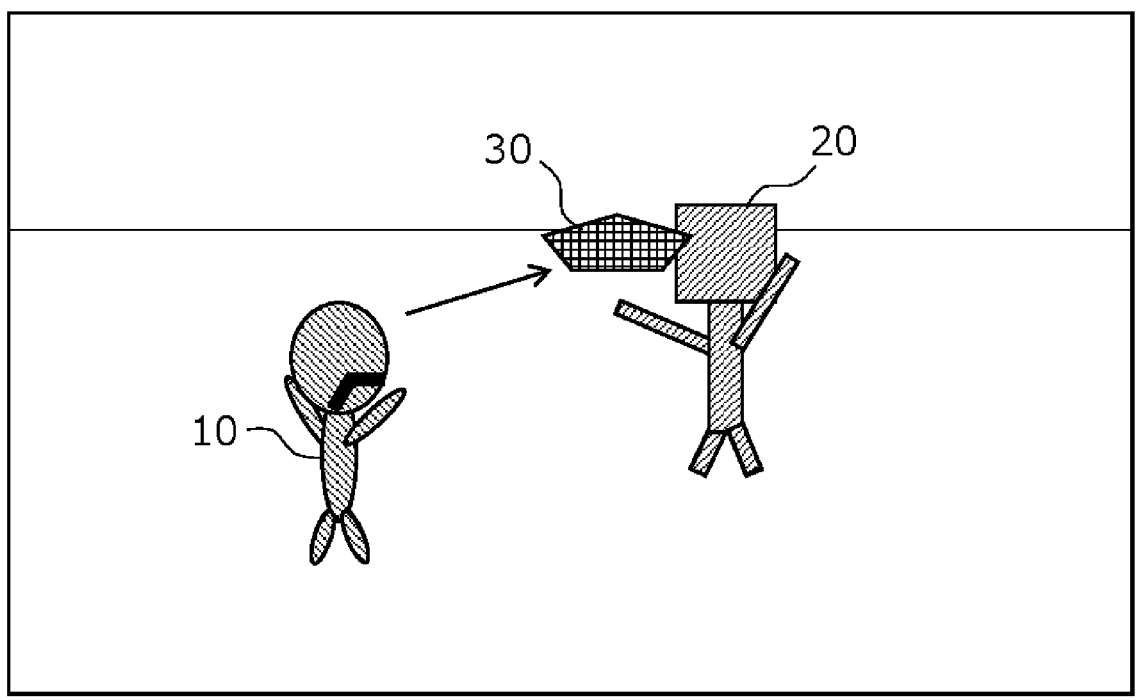
FIG. 9 is a diagram illustrating an example of the game screen.
Figure 10:
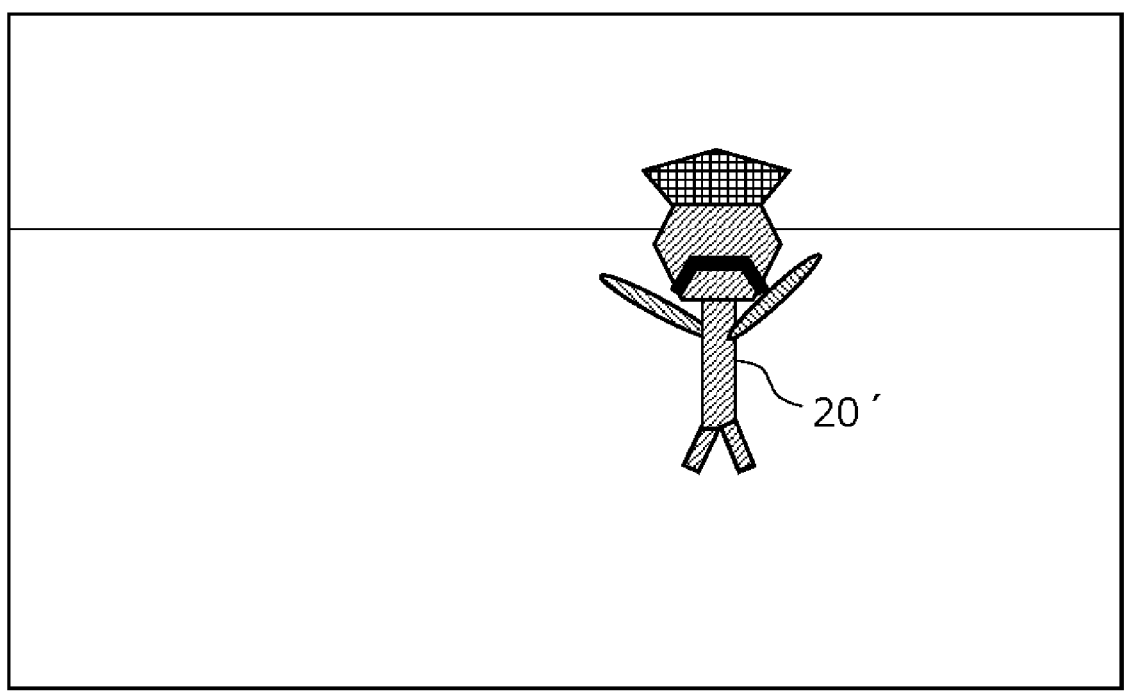
FIG. 10 is a diagram illustrating an example of the game screen.

When the hat object 30 discharged from the PC 10 hits the NPC 20 as illustrated in FIG. 9, the PC 10 possesses the NPC 20 as illustrated in FIG. 10. The PC 10 disappears from the game screen because of this possession and the NPC 20 is displayed as an NPC 20' incorporating some elements of the PC 10 such that it can be seen that the PC 10 has possessed the NPC 20. While the PC 10 possesses the NPC 20, the player can operate the NPC 20' possessed by the PC 10 instead of the PC 10. In addition, it is possible to release the possession by the PC 10 such that the PC 10 leaves the NPC 20'.

Figure 11:
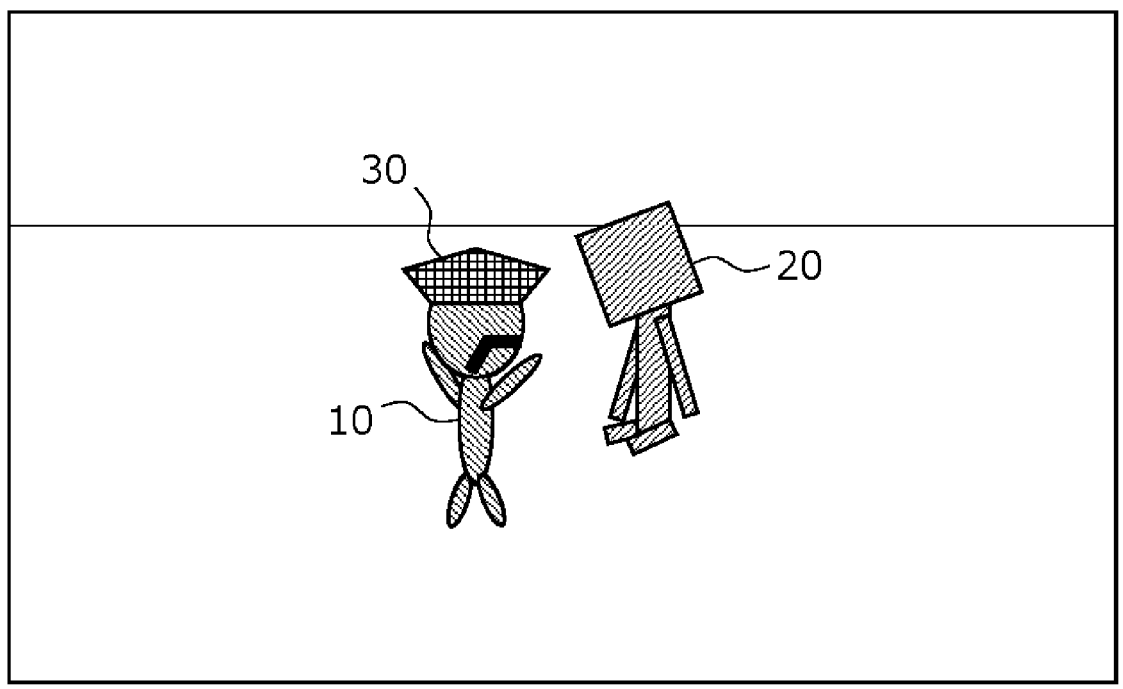
FIG. 11 is a diagram illustrating an example of the game screen.

FIG. 11 illustrates a state in which the PC 10 has left the NPC 20' possessed by the PC 10. The PC 10 enters the game screen because of this leaving and the NPC 20' returns to the original NPC 20. At this time, the PC 10 appears in the vicinity of the NPC 20. Alternatively, the PC 10 may appear in the vicinity of the NPC 20 by animation such as that the PC 10 jumps out from the NPC 20' possessed by the PC 10.

As for the NPC 20, during a predetermined time period after this leaving, NPC 20 is placed in a stunned state so as to stop at the current place without moving and also stop an attack to the PC 10 and not to do damage to the PC 10 even if the PC 10 makes contact therewith. As a result, the PC 10 that appeared in the vicinity of the NPC 20 is not immediately attacked by the NPC 20 and receives no damage even if the PC 10 makes contact therewith. Additionally, since the NPC 20 is stopped without moving, it is also easy for the PC 10 to possess the NPC 20 again. When the predetermined time period elapses, the NPC 20 moves as originally and restarts an attack to the PC 10, for example.

Figure 12:
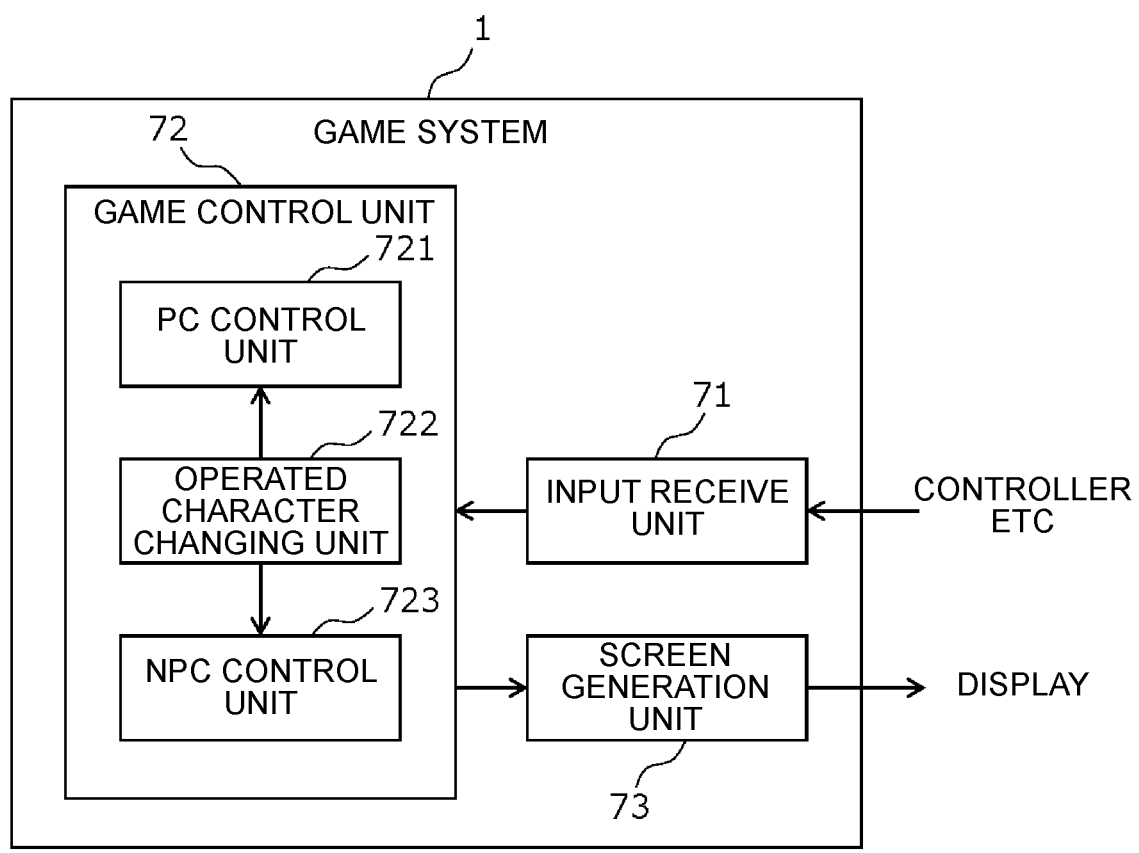
FIG. 12 is a block diagram illustrating an example of a functional configuration of a game system.

Next, the configuration of the game system 1 for performing the game control as described above will be described. FIG. 12 is a block diagram illustrating a functional configuration of the game system 1. The game system 1 includes an input receiving unit 71, a game control unit 72, and a screen generation unit 73. The left terminal 17, the right terminal 21, and the touch panel controller 86 of the main body device 2 illustrated in FIG. 6 correspond to the input receiving unit 71. The game control unit 72 and the screen generation unit 73 are implemented by the processor 81 of the main body device 2 illustrated in FIG. 6 executing the game program stored in a storage medium mounted in the slot 23 or the flash memory 84.

The input receiving unit 71 receives an input made by the player operating the left controller 3, the right controller 4, and the touch panel 13. The game control unit 72 controls the game according to input received by the input receiving unit 71 in accordance with the game program. The game control unit 72 includes a PC control unit 721, an operated character changing unit 722, and an NPC control unit 723. The screen generation unit 73 generates a game screen reflecting the results of the game processing of the game control unit 72, including PC control processing in the PC control unit 721, operated character changing processing in the operated character changing unit 722, and NPC control processing in the NPC control unit 723 and outputs the generated game screen to the display.

The operated character changing unit 722 changes an object assigned as an operated object to be operated in response to input received by the input receiving unit 71 among objects in the virtual space, between the PC 10 and the NPC 20. The operated character changing unit 722 assigns the PC 10 as the operated object at the start of the game.

Once the operated character changing unit 722 sets the PC 10 as the operated object, the PC control unit 721 controls the behavior of the PC 10 in the virtual space in accordance with input received by the input receiving unit 71. Specifically, when the input receiving unit 71 receives the input of a movement direction, the PC control unit 721 moves the PC 10 in accordance with this movement direction in the virtual space and, when the input receiving unit 71 receives the input of the hat throwing motion, the PC control unit 721 causes the PC 10 to execute the hat throwing motion. In this manner, the PC 10 is operated in response to input received by the input receiving unit 71 so as to move and execute various actions in the virtual space.

While the PC 10 is assigned as the operated object, the NPC control unit 723 controls the NPC 20 in accordance with the game program. A control method for the NPC 20 by the NPC control unit 723 in this case is hereinafter referred to as a "first control method". The first control method is a control method for a normal state while the NPC 20 is not assigned as the operated object. For example, the NPC control unit 723 moves the NPC 20 toward the PC 10 and controls the NPC 20 such that the NPC 20 attacks the PC 10 when a predetermined action condition is satisfied (for example, when a distance between the NPC 20 and the PC 10 becomes smaller than a predetermined value).

When the hat throwing motion illustrated in FIG. 9 is performed in a case where the PC 10 is assigned as the operated object, the operated character changing unit 722 judges whether the thrown hat object 30 has hit the NPC 20. When it is judged that the hat object 30 discharged from the PC 10 has hit the NPC 20, the operated character changing unit 722 changes an object to serve as the operated object from the PC 10 to the NPC 20.

Once the NPC 20 is assigned as the operated object, the operated character changing unit 722 first erases the display of the PC 10 and changes the picture of the NPC 20 to a picture incorporating elements of the PC 10 such that the fact that the NPC 20 is serving as the operated object is visually distinguishable. The NPC 20 whose picture has been changed because of the possession in this manner is denoted as "NPC 20'" (refer to FIG. 10). In the example in FIG. 10, the mustache that the PC 10 had is incorporated into the NPC 20', elements of the PC 10 are also incorporated into the arms of the NPC 20', and the shape of the head of the NPC 20' has a shape such as when the PC 10 and the NPC 20 are combined. By this change in character, the player can recognize, during the game, that the NPC 20 is possessed by the PC 10 (the PC 10 has possessed the NPC 20) and accordingly the NPC 20 is assigned as the operated object.

Once the operated character changing unit 722 sets the NPC 20 as the operated object, the NPC control unit 723 controls the behavior of the NPC 20' in the virtual space in accordance with input received by the input receiving unit 71. As a result, the NPC 20' is operated in response to input received by the input receiving unit 71 so as to move and execute various actions in the virtual space.

Note that, although the display of the PC 10 is erased when the NPC 20 is assigned as the operated object, in the game processing, the game control unit 72 performs processing such that the PC 10 moves to accompany the NPC 20'. Thus, for example, in a case where the NPC 20' falls to a falling death judgment area in the virtual space, also the PC 10 falls with the NPC 20' and the game control unit 72 performs game processing that the PC 10 fell and died.

The player can release the possession of the NPC 20. In the present embodiment, the player can release the possession by pressing the B button 54 of the right controller 4. When the input receiving unit 71 receives input of pressing of the B button 54 while the NPC 20 is in a possessed state, the operated character changing unit 722 changes a character to serve as the operated object from the NPC 20 to the PC 10.

Once the PC 10 is assigned as the operated object, the operated character changing unit 722 causes the PC 10 to appear in the vicinity of the NPC 20'. Since the NPC 20' is no longer the operated object, the NPC control unit 723 returns the picture of the NPC 20' to the original picture and assigns the NPC 20' as the NPC 20 (refer to FIG. 11).

Once the operated character changing unit 722 changes a character to serve as the operated object from the NPC 20 to the PC 10, the PC control unit 721 controls the behavior of the PC 10 in the virtual space in accordance with input received by the input receiving unit 71.

During a period until a predetermined condition is satisfied after an object to serve as the operated object is changed from the NPC 20 to the PC 10 by the operated character changing unit 722, the NPC control unit 723 controls the NPC using a control method different from the first control method. A control method for the NPC 20 by the NPC control unit 723 in this case is hereinafter referred to as a "second control method". For example, the NPC control unit 723 uses the second control method to stop the NPC 20 at the current place and to control the NPC 20 such that the NPC 20 also stops an attack against the PC 10 and does not do damage to the PC 10 even if the PC 10 makes contact therewith.

When the predetermined condition is satisfied, the NPC control unit 723 switches from the second control method (for example, stop at the current place, no attack, doing no damage) to the first control method (for example, moving to follow the PC 10, attacking the PC 10, and doing damage to the PC 10 that has made contact therewith) to control the NPC 20. In the present embodiment, the predetermined condition for switching from the second control method to the first control method is that a predetermined time period (for example, three seconds) has elapsed since the PC 10 leaves the NPC 20. That is, the NPC control unit 723 stops the NPC 20 at the current place for the predetermined time period after the possession of the NPC 20 by the PC 10 is released and the PC 10 appears near the NPC 20.

In a case where the NPC 20 is controlled by the second control method, when it is judged that the PC 10 has performed the hat throwing motion and the hat object 30 has hit the NPC 20, the operated character changing unit 722 again changes an object to serve as the operated object from the PC 10 to the NPC 20. That is, the change of the operated object is permitted irrespective of whether the NPC 20 is controlled using the first control method or the second control method and the operated character changing unit 722 changes an object to serve as the operated object from the PC 10 to the NPC 20 when judging that the hat object 30 has hit the NPC 20.

The NPC control unit 723 controls the NPC 20 by the second control method different from the first control method after the possession is released such that the PC 10 is not immediately attacked by the NPC 20 located near the PC 10 after the possession is released and additionally, since the NPC 20 is stopped without moving under the second control method, it is easy to possess the NPC 20 again. Incidentally, as this control of the NPC 20 after the release of the possession (leaving), the second control method may shift to the first control method gradually in such a manner that, for example, the attack is stopped for three seconds and the movement is stopped for five seconds.

Figure 13:
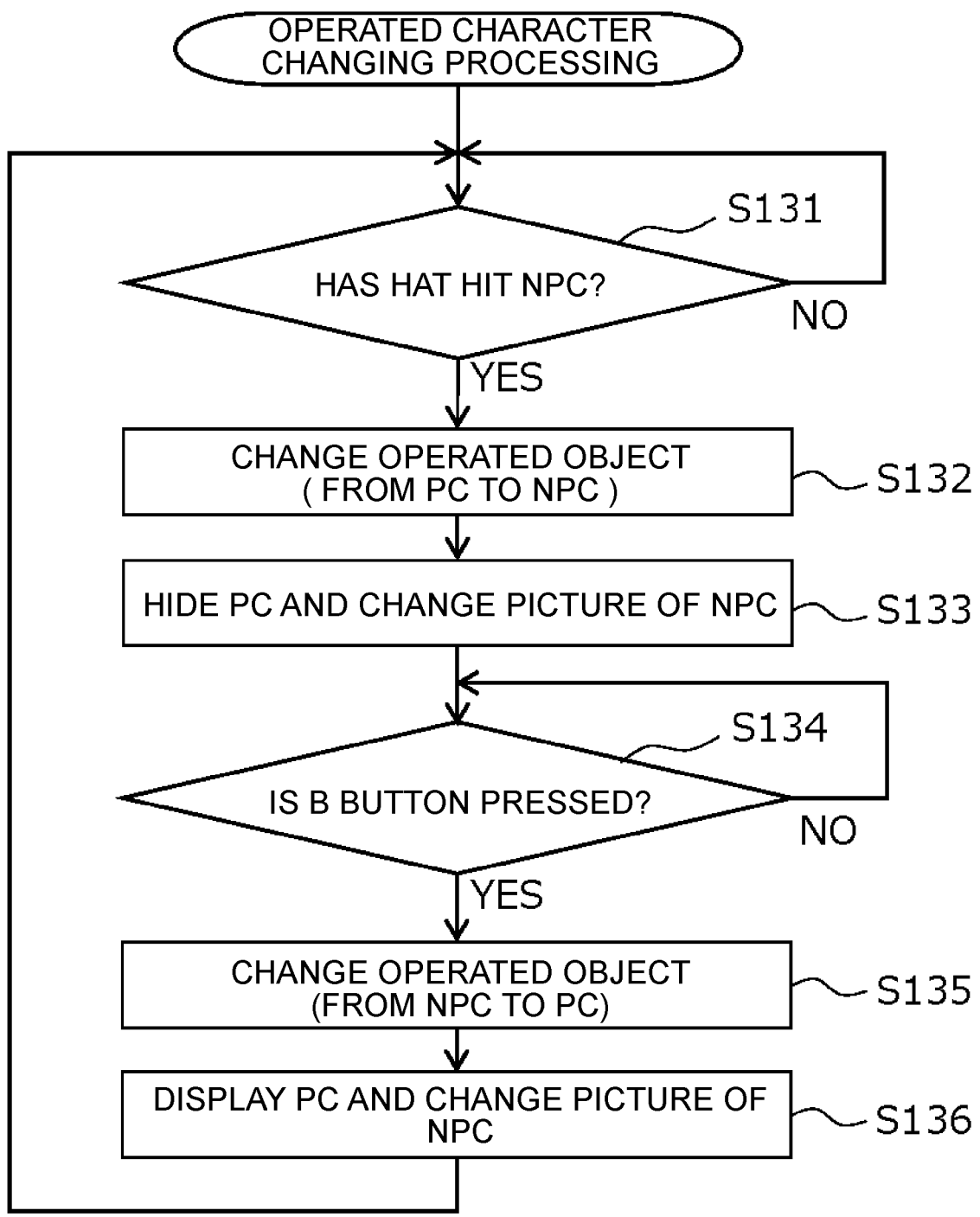
FIG. 13 is a diagram illustrating an example of a flow of operated character changing processing.

FIG. 13 is a flowchart of the operated character changing processing performed by the operated character changing unit 722. As described earlier, the PC 10 is initially assigned as the operated object at the start of the game. The operated character changing unit 722 judges whether the hat object 30 has hit the NPC 20 (step S131). When the hat object 30 has not hit the NPC 20 (NO in step S131), this judgment is repeated.

When it is judged that the hat object 30 has hit the NPC 20 (YES in step S131), the operated character changing unit 722 changes a character to serve as the operated object from the PC 10 to the NPC 20 (step S132). Then, the operated character changing unit 722 hides the PC 10 and changes the picture of the NPC 20 to assign the NPC 20 as the NPC 20' (step S133).

Next, the operated character changing unit 722 judges whether the B button 54 for releasing the possession is pressed (step S134). When the B button 54 has not been pressed (NO in step S134), this judgment is repeated. When the B button 54 is pressed (YES in step S134), the operated character changing unit 722 changes a character to serve as the operated object from the NPC 20 to the PC 10 (step S135). Then, the operated character changing unit 722 displays the PC 10 that has been hidden and changes the NPC 20' to return to the original picture (step S136). Thereafter, the processing returns to step S131.

Figure 14:
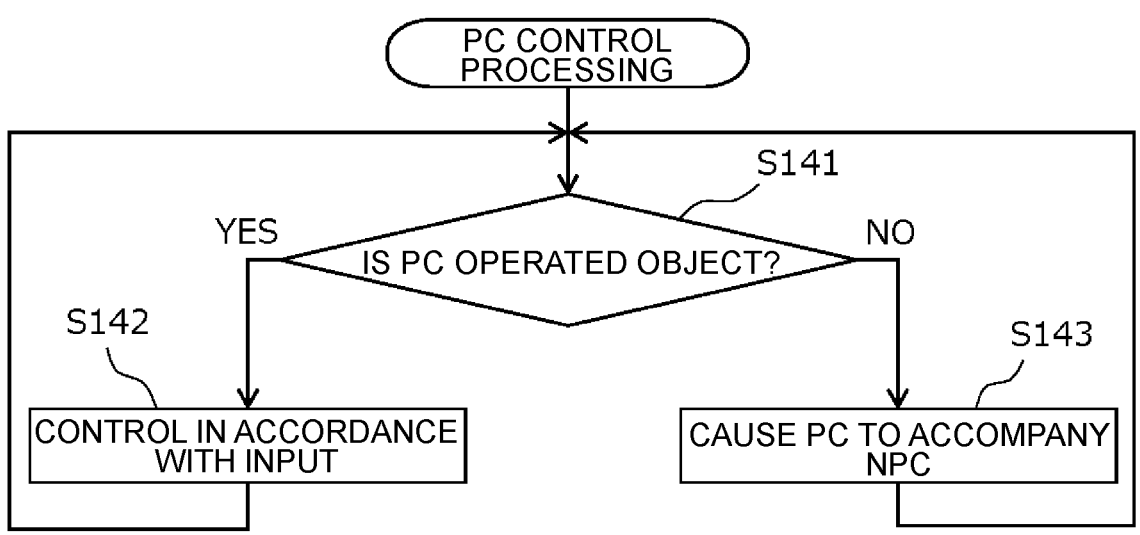
FIG. 14 is a diagram illustrating an example of a flow of PC control processing.

FIG. 14 is a flowchart of the PC control processing performed by the PC control unit 721. The PC control unit 721 judges whether the PC 10 is assigned as the operated object (step S141). When the PC 10 is assigned as the operated object (YES in step S141), the PC control unit 721 controls the behavior of the PC 10 in accordance with input received by the input receiving unit 71 (step S142). When the PC 10 is not assigned as the operated object (NO in step S141), the PC control unit 721 controls such that the hidden PC 10 moves to accompany the NPC 20 (step S143).

Figure 15:
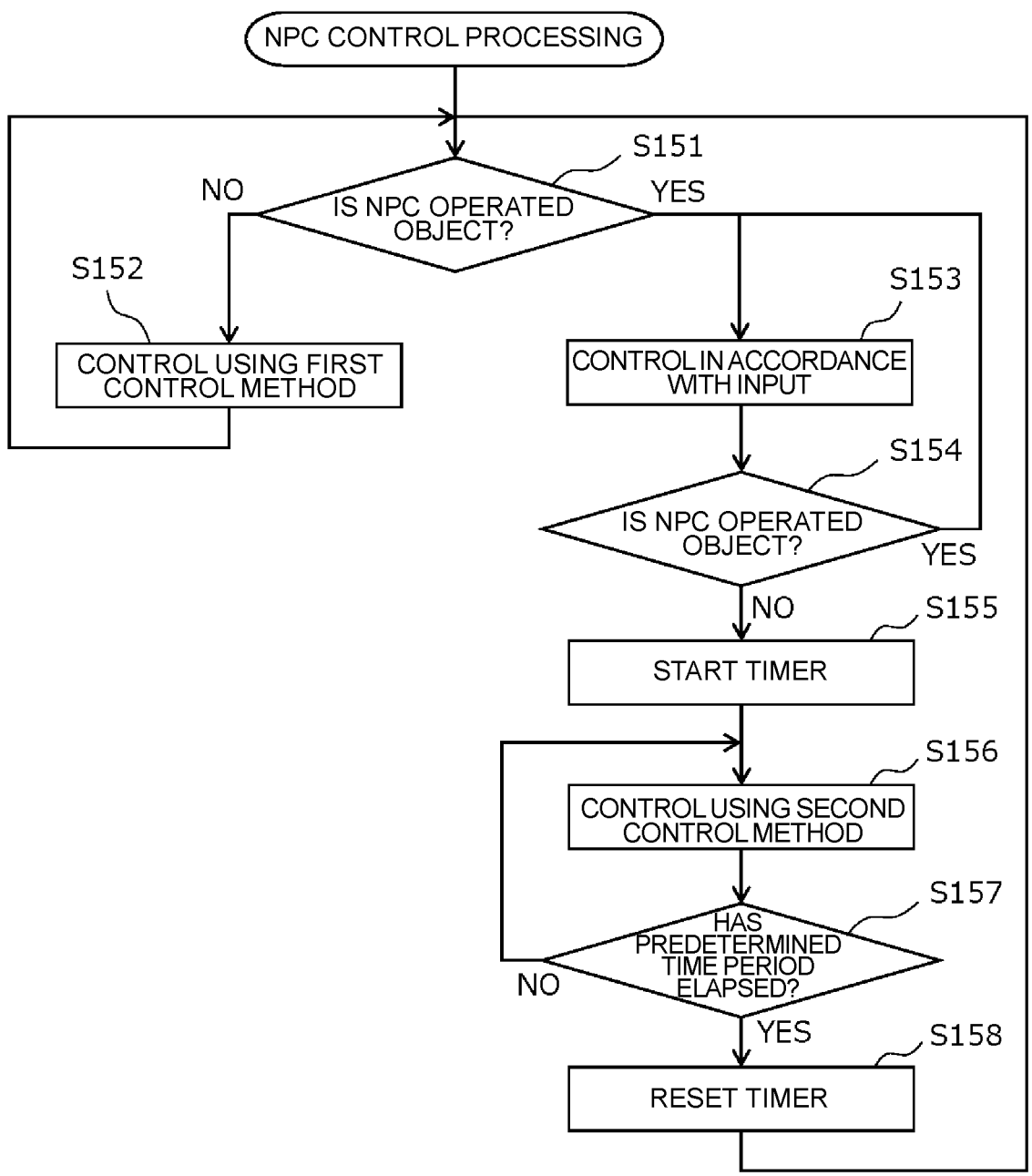
FIG. 15 is a diagram illustrating an example of a flow of NPC control processing.

FIG. 15 is a flowchart of the NPC control processing performed by the NPC control unit 723. The NPC control unit 723 judges whether the NPC 20 is assigned as the operated object (step S151). When the NPC 20 is not assigned as the operated object (NO in step S151), the NPC control unit 723 controls the behavior of the NPC 20 using the first control method (step S152). When the NPC 20 is assigned as the operated object (YES in step S151), the NPC control unit 723 controls the behavior of the NPC 20 in accordance with input received by the input receiving unit 71 (step S153).

Then, the NPC control unit 723 judges whether the NPC 20 has been assigned as the operated object (step S154). When the NPC 20 is assigned as the operated object (YES in step S154), the NPC control unit 723 continues the control (step S153) of the NPC 20 in accordance with input received by the input receiving unit 71.

When the assignment of the NPC 20 as the operated object is canceled by the operated character changing unit 722 (NO in step S154) while the NPC 20 is controlled in accordance with input received by the input receiving unit 71 (step S153), a timer is started (step S155) and the behavior of the NPC 20 is controlled using the second control method (step S156). Then, the NPC control unit 723 judges whether the elapsed time of the timer has reached the predetermined time period (step S157). When the predetermined time period has not elapsed (NO in step S157), the control of the NPC 20 by the second control method is continued. When the predetermined time period has elapsed (YES in step S157), the timer is reset (step S158) and the processing returns to step S151.

As described above, according to the game system 1 of the present embodiment, when the possession is released (leaving) (NO in step S154) after the PC 10 possesses the NPC 20 and the PC 10 is hidden, although the PC 10 appears in the vicinity of the NPC 20, the NPC 20 is caused to stop until the predetermined time period elapses so as not to attack the PC 10 and not to do damage to the PC 10 even if the PC 10 makes contact therewith. Therefore, the PC 10 that has appeared because of the release of the possession is not immediately attacked by the NPC 20 located in the vicinity or receives no damage therefrom and additionally, since the NPC 20 is stopped, the possession again becomes easy.

In the above embodiment, under the control for the normal state by the first control method, the NPC 20 is caused, in accordance with the game program, to follow the PC 10, move so as to go away from the PC 10, attack the PC 10 under a predetermined condition, or do damage to the PC 10 when the PC 10 makes contact therewith. Meanwhile, under the control immediately after leaving by the second control method, moving, attacking, and doing damage by the NPC 20 is stopped. That is, in the second control method, the NPC 20 is controlled so as to be advantageous to the player (the PC 10). The control of the NPC 20 advantageous to the player in this manner is not limited to the above example. Hereinafter, a modification of the second control method for the NPC 20 will be described.

Figure 16:
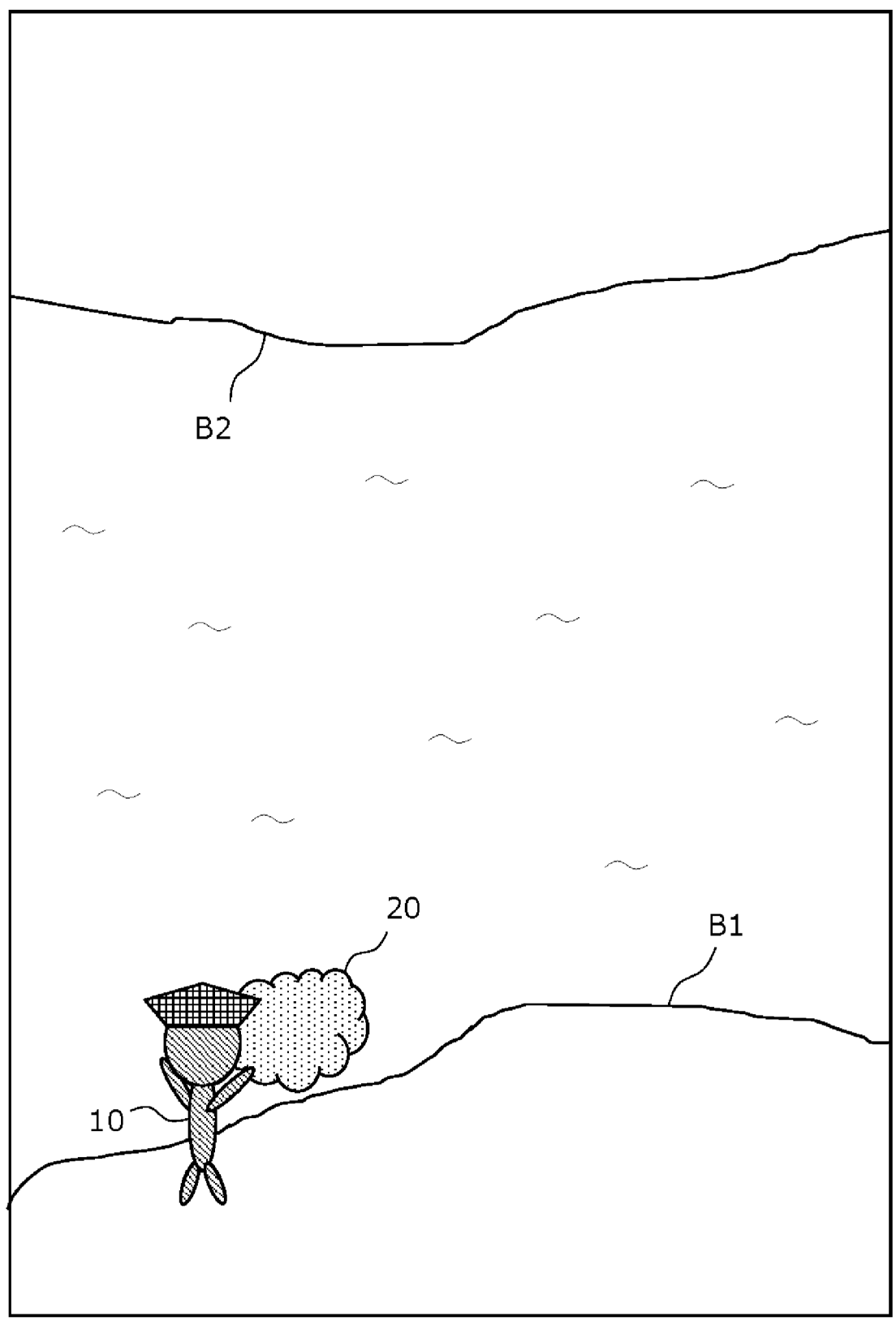
FIG. 16 is a diagram illustrating an example of the game screen for explaining a modification of a second control method for an NPC.
Figure 17:
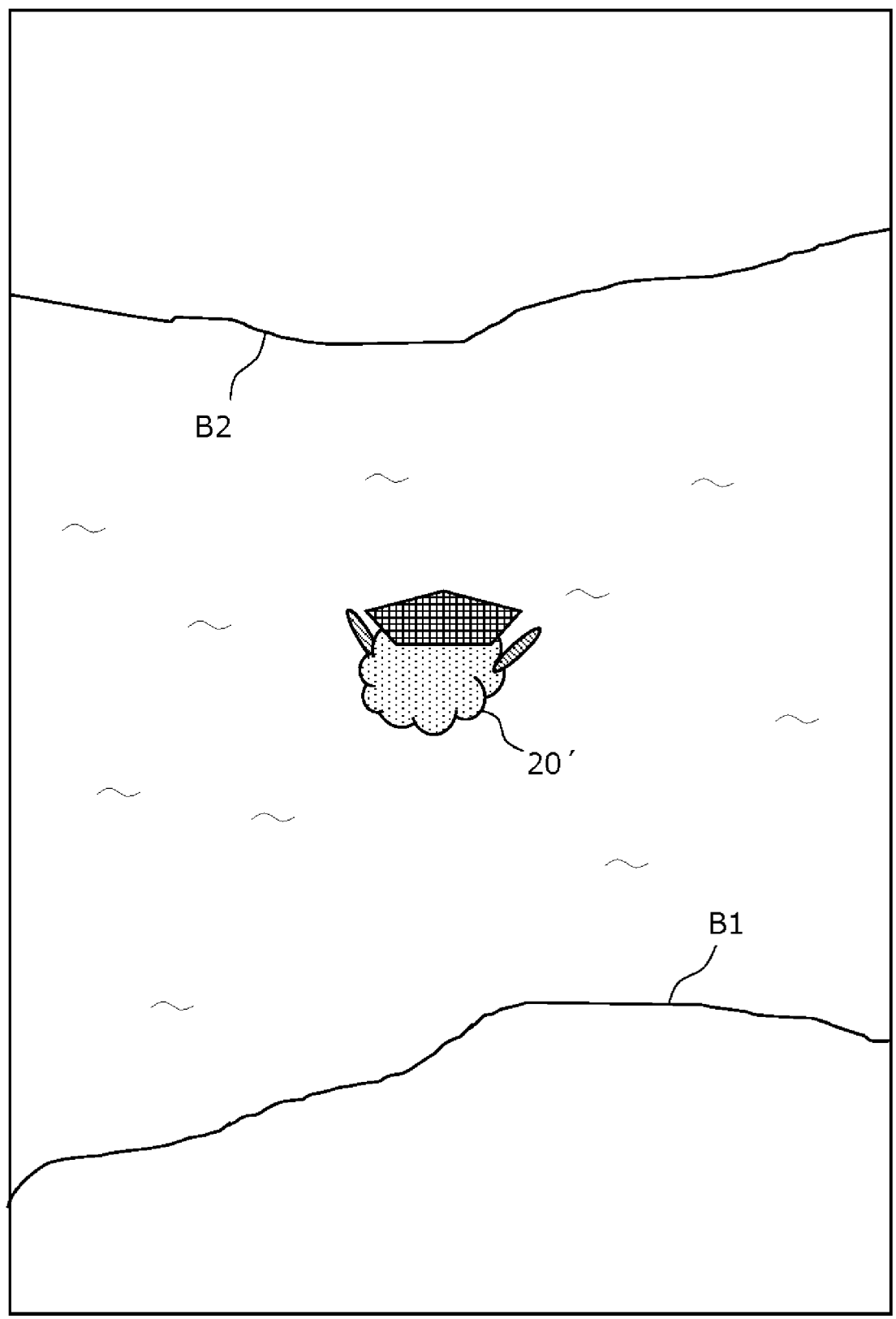
FIG. 17 is a diagram illustrating an example of the game screen for explaining the modification of the second control method for the NPC.

FIGS. 16 to 19 are diagrams illustrating examples of the game screens for explaining the modification of the second control method for the NPC 20. As illustrated in FIG. 16, in the virtual space, a shore object B1 on the near side and a shore object B2 on the far side are set with a river therebetween and the PC 10 is located on the shore object B1 on the near side. The NPC 20 in the form of a cloud is floating on the river and the NPC 20 is positioned beside the shore object B1. That is, the NPC 20 is floating on the river with the position illustrated in FIG. 16 as a fixed position.

The PC 10 cannot proceed through the river or on the river. The PC 10 can possess the NPC 20 by making contact with the NPC 20. When the PC 10 possesses the NPC 20, as in the above embodiment, the picture of the NPC 20 is changed to a picture incorporating elements of the PC 10 in part and the NPC 20 becomes the NPC 20'. In this state, the player can cross the river by operating the NPC 20'.

Figure 18:
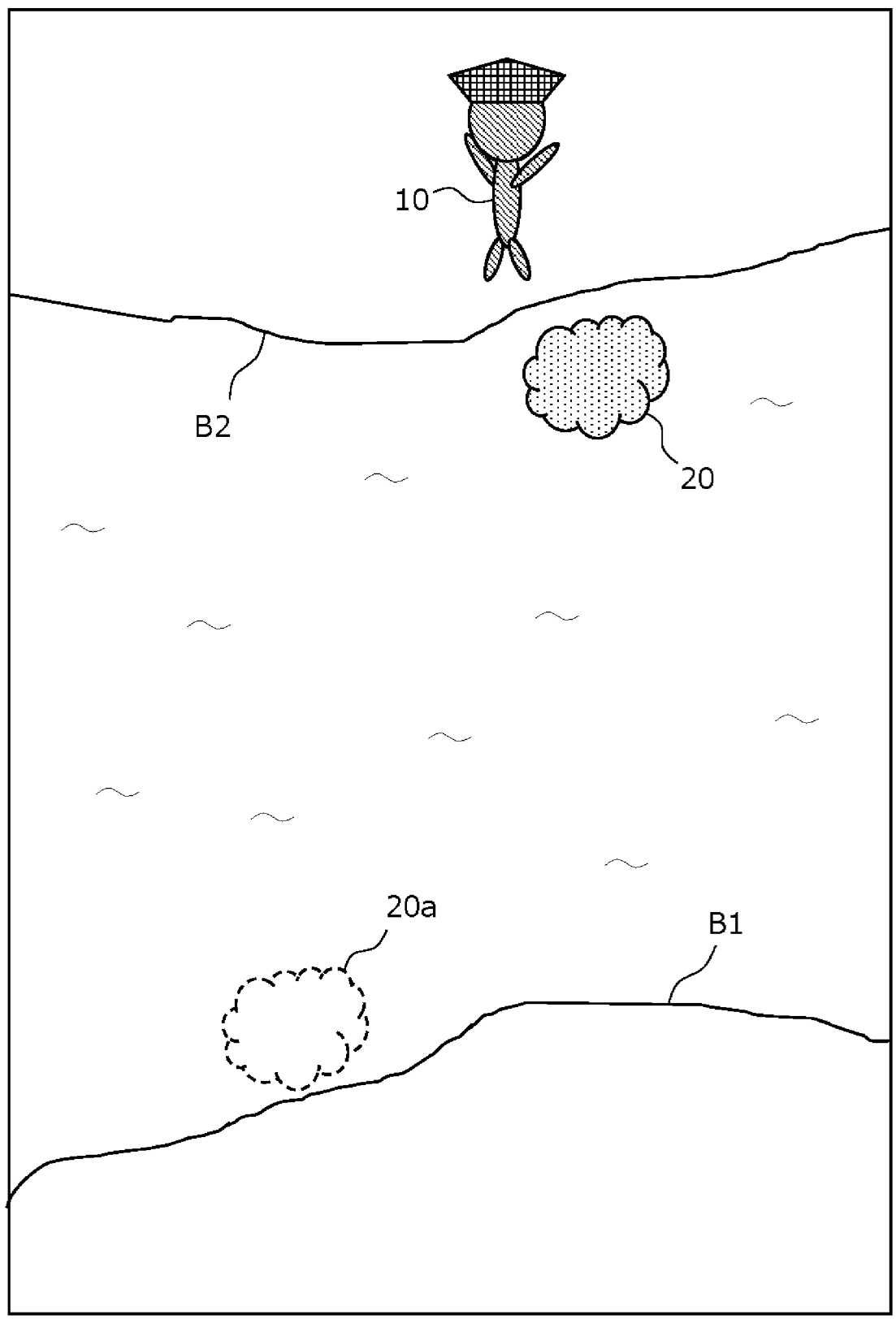
FIG. 18 is a diagram illustrating an example of the game screen for explaining the modification of the second control method for the NPC.
Figure 19:
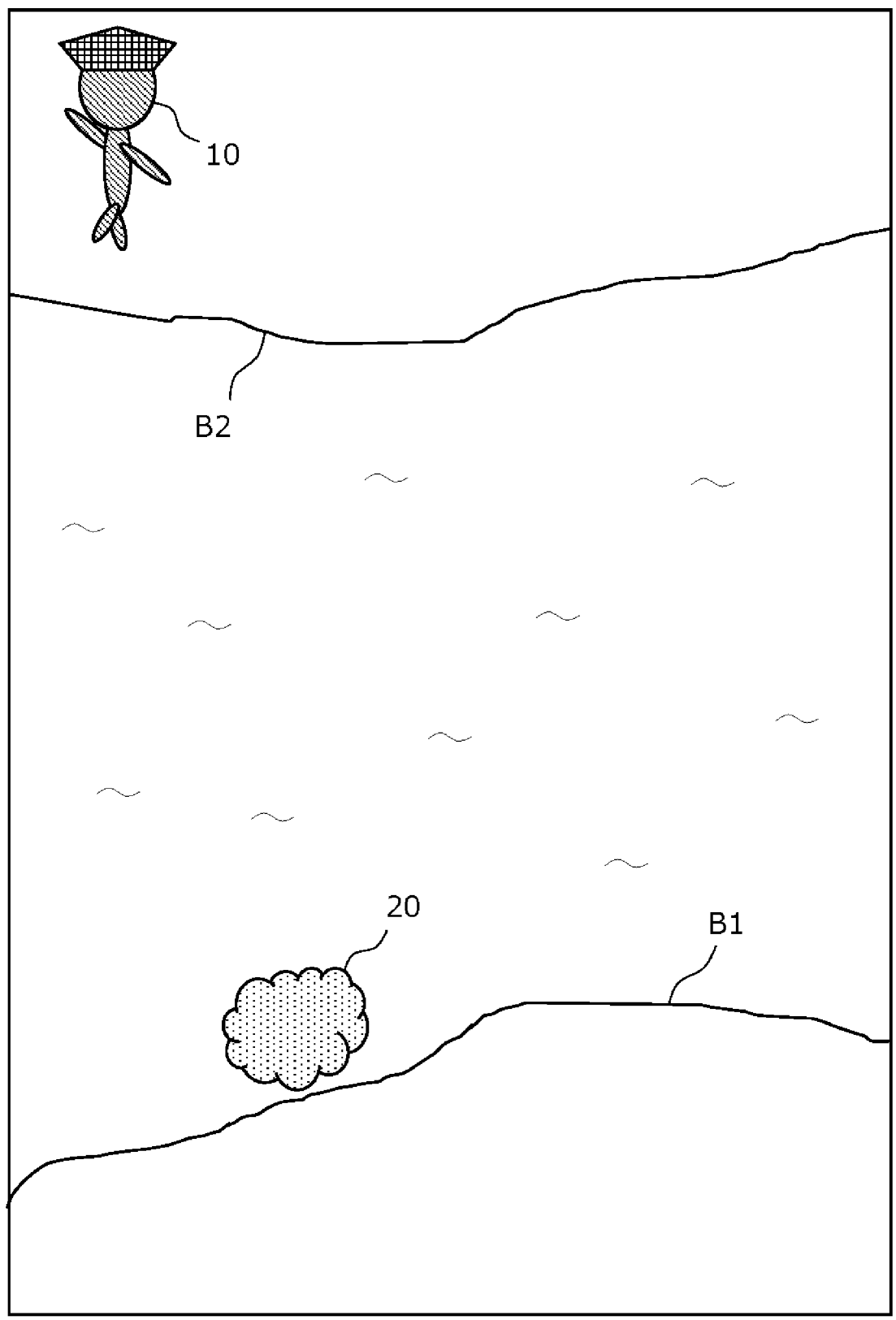
FIG. 19 is a diagram illustrating an example of the game screen for explaining the modification of the second control method for the NPC.

In addition, the player can release the possession by pressing the B button 54. When the possession is released at a time point at which the NPC 20' proceeds across the river and arrives at the shore object B2, as illustrated in FIG. 18, the picture of the NPC 20' returns to that of the NPC 20 and the PC 10 appears in the vicinity of the NPC 20 on the shore object B2. Since the NPC 20' has returned to the NPC 20, the NPC 20' is supposed to return to a position 20*a* as the fixed position when the original control is resumed. However, until the predetermined condition is satisfied, the NPC 20 left by the PC 10 stays at the position at that time or in the vicinity thereof and, when the predetermined condition is satisfied, returns to the fixed position 20*a*.

Here, in the present modification, the control in which the NPC 20 stays at the position at the time of leaving by the PC 10 is the second control method and the control in which the NPC 20 stays at the fixed position 20*a* is the first control method. In this example, the predetermined condition for the NPC 20, for which the possession is released, to return to the fixed position 20*a* is that the PC 10 that has appeared because of leaving is separated from the NPC 20 by a predetermined distance or more. In the example in FIG. 19, since the PC 10 is separated from the NPC 20 that has been left by the PC 10 by a predetermined distance or more, the NPC 20 has returned to the fixed position 20*a*.

The PC 10 can possess the NPC 20 again by making contact with the NPC 20 positioned beside the shore object B2. After the NPC 20 is possessed, the NPC 20 is transformed into the NPC 20' to be assigned as the operated object. When the player operates the NPC 20' to cause the NPC 20' to arrive at the shore object B1 and releases the possession at this time point, the NPC 20' is transformed into the NPC 20 and at the same time the PC 10 appears in the vicinity of the NPC 20 on the shore object B1.

As described above, in the present modification, the PC 10 can possess the NPC 20 and cross the river to land on the shore object B2 on the far side, while also being able to possess the NPC 20 to return to the shore object B1 from the shore object B2. At this time, when the PC 10 leaves the NPC 20' on the shore object B2 on the far side, if the normal control is immediately resumed such that the NPC 20 moves to the fixed position 20*a*, the PC 10 who has landed on the shore object B2 can no longer come back to the shore object B1. Therefore, the NPC 20 is designed to stop at the leaving position or the vicinity thereof after the PC 10 leaves the NPC 20 until the PC 10 is separated from the NPC 20 to an adequate extent.

This modification also can be implemented by the configuration of the game system 1 illustrated in FIG. 12. In addition, the flows of the processing by the operated character changing unit 722 and the PC control unit 721 are the same as the flows in FIG. 13 and FIG. 14, respectively. However, in the present modification, it is judged in step S131 whether the PC 10 has made contact with the NPC 20.

Figure 20:
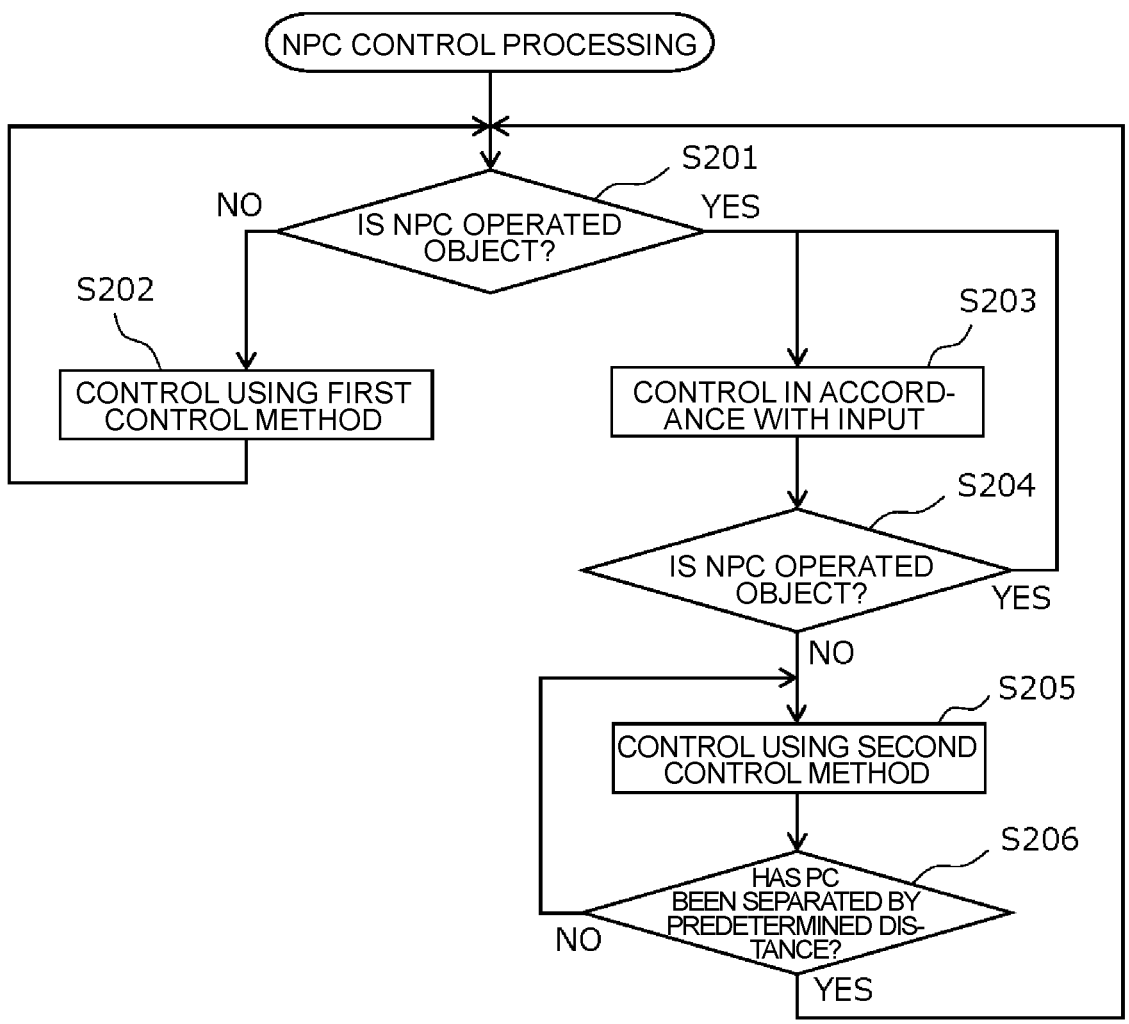
FIG. 20 is a diagram illustrating an example of a flow of NPC control processing of the modification.

FIG. 20 is a flowchart of the NPC control processing performed by the NPC control unit 723 of the present modification. The NPC control unit 723 judges whether the NPC 20 is assigned as the operated object (step S201). When the NPC 20 is not assigned as the operated object (NO in step S201), the NPC control unit 723 controls the behavior of the NPC 20 using the first control method (step S202). That is, the NPC control unit 723 causes the NPC 20 to stay at the fixed position 20*a*. When the NPC 20 is assigned as the operated object (YES in step S201), the NPC control unit 723 controls the behavior of the NPC 20 in accordance with input received by the input receiving unit 71 (step S203).

Then, the NPC control unit 723 judges whether the NPC 20 has been assigned as the operated object (step S204). When the NPC 20 is assigned as the operated object (YES in step S204), the NPC control unit 723 continues the control (step S203) of the NPC 20 in accordance with input received by the input receiving unit 71.

When the assignment of the NPC 20 as the operated object is canceled by the operated character changing unit 722 (NO in step S204) while the NPC 20 is controlled in accordance with input received by the input receiving unit 71 (step S203), the NPC control unit 723 controls the behavior of the NPC 20 using the second control method (step S205). Then, the NPC control unit 723 judges whether the PC 10 has been separated from the NPC 20 by the predetermined distance or more (step S206). When the PC 10 is located within the predetermined distance from the NPC 20 (NO in step S206), the control of the NPC 20 by the second control method is continued and, when the PC 10 is separated from the NPC 20 by the predetermined distance or more (YES in step S206), the processing returns to step S201.

As described above, in the present modification, the NPC 20 does not return to the fixed position immediately after the PC 10 leaves the NPC 20 (NO in step S204). Therefore, if the PC 10 is desired to return to the shore object B1 again after getting down on the shore object B2, the PC 10 can possess the NPC 20 staying beside the shore object B2.

As described thus far, in the above embodiments and the modifications thereof, the NPC 20 immediately after the PC 10 leaves the NPC 20 is controlled by the second control method different from the first control method for the normal state. This second control method is in any case a control method advantageous to the player (PC 10) in developing of the game.

Note that, although the above embodiment simply indicates one NPC 20, a plurality of NPCs may exist in the virtual space and the above-described possession may be selectively enabled for a specific type of NPC among the plurality of NPCs.

In addition, in the above embodiments, the NPC control unit 723 uses a control method for the NPC 20 in the normal state when the PC 10 does not possess the NPC 20 as the first control method and uses a control method for a state immediately after the possession is released, which is different from the control method for the normal state, as the second control method, so as to return the second control method to the first control method after a predetermined condition is satisfied. However, after the second control method, the NPC 20 may be controlled by a third control method different from the first control method and the second control method. Furthermore, the NPC control unit 723 may control the NPC 20 so as to return this second control method to the first control method by way of the third control method. For example, in a case where the first control method is control to move the NPC 20 such that the NPC 20 approaches the PC 10, the second control method may be assigned as control to stop the NPC 20 at the current place and the third control method may be assigned as control to move the NPC 20 such that the NPC 20 goes away from the PC 10.

Additionally, in the above embodiments, the NPC control unit 723 controls the NPC 20 after the possession is released as the second control method such that the NPC 20 stops at the current place without moving, stops an attack to the PC 10, and does not do damage to the PC 10 even if the PC 10 makes contact therewith. However, the second control method may perform a part of these types of control selectively. For example, the second control method may control so as to do damage to the PC 10 when contact is made by the PC 10 but not to attack or move to the PC 10.

Meanwhile, in the above embodiments, when the PC 10 possesses the NPC 20, the character thereof is changed to be assigned as the NPC 20' such that the NPC 20 can be visually distinguished as being possessed by the PC 10.

However, it is not always necessary to change the appearance of the possessed NPC 20.

What is claimed is:

1. A non-transitory storage medium having stored therein an information processing program that when executed by at least one processor, causes the at least one processor to provide execution comprising:

receive input by a player;

change an object to serve as an operated object between a first object and a second object among objects in a virtual space, the operated object being operated in response to the input;

control the second object using a first control method while the second object does not serve as the operated object, the first control method includes control to arrange the second object at a predetermined position in the virtual space;

control the second object using a second control method, that includes arranging the second object at a position of the second object or in a vicinity of the position where an object to serve as the operated object is changed from the second object to the first object, until a predetermined condition associated with, at least, a distance between the first object and the second object is satisfied after an object to serve as the operated object is changed from the second object to the first object; and control the second object using the first control method, that includes arranging the second object at the predetermined position in the virtual space, after the predetermined condition is satisfied.

2. The non-transitory storage medium according to claim 1, the information processing program further causing the at least one processor to provide execution comprising display the first object while the first object serves as the operated object and hide the first object while the second object serves as the operated object.

3. The non-transitory storage medium according to claim 1, the information processing program further causing the at least one processor to provide execution comprising arrange the first object in a vicinity of the second object when an object to serve as the operated object is changed from the second object to the first object.

4. The non-transitory storage medium according to claim 1, wherein the first control method includes control to move the second object such that the second object approaches the first object.

5. The non-transitory storage medium according to claim 1, wherein the first control method includes control to move the second object such that the second object goes away from the first object.

6. The non-transitory storage medium according to claim 1, wherein the first control method includes control to cause the second object to attack the first object and the second control method includes control to stop an attack to the first object by the second object.

7. The non-transitory storage medium according to claim 1, wherein the first control method includes control to do damage to the first object in a case where the first object makes contact with the second object and the second control method includes control to prevent damage to the first object in a case where the first object makes contact with the second object.

8. The non-transitory storage medium according to claim 1, wherein the information processing program further causes the at least one processor to provide execution comprising change an object to serve as the operated object from the first object to the second object when a third object discharged from the first object serving as the operated object hits the second object.

9. The non-transitory storage medium according to claim 1, wherein the information processing program further causes the at least one processor to provide execution comprising allow to change an object to serve as the operated object from the first object to the second object during a period until a predetermined condition is satisfied after an object to serve as the operated object is changed from the second object to the first object.

10. The non-transitory storage medium according to claim 1, wherein the information processing program further causes the at least one processor to provide execution comprising, while the second object serves as the operated object, place the second object into a state visually distinguishable from while not serving as the operated object.

11. The non-transitory storage medium according to claim 1, wherein the second control method includes disabling movement of the second object for a period of time and then switching the second object to the first control method after the period of time elapses.

12. The non-transitory storage medium according to claim 1, wherein the operated object is operated based on input received by the player.

13. The non-transitory storage medium according to claim 1, wherein the second control method further includes preventing the second object from moving position until a predetermined condition associated with a period of time is satisfied.

14. The non-transitory storage medium according to claim 1, wherein the second object is prevented from damaging the first object when the first object makes contact with the second object while the second object is controlled using the second control method.

15. The non-transitory storage medium according to claim 1, wherein the second object moves from the position of the second object, or in the vicinity of the position where the object to serve as the operated object is changed from the second object to the first object, back to the predetermined position in the virtual space after the predetermined condition is satisfied.

16. The non-transitory storage medium according to claim 15, wherein the second object moves back to the predetermined position after the first object is at a position where the distance between the first object and the second object is equal to or exceeding a predetermined value.

17. An information processing device comprising at least one processor, the at least one processor configured to:

receive input by a player;

change an object to serve as an operated object between a first object and a second object among objects in a virtual space, the operated object being operated in response to the input;

control the second object using a first control method while the second object does not serve as the operated object, the first control method includes control to arrange the second object at a predetermined position in the virtual space;

control the second object using a second control method, that includes arranging the second object at a position of the second object or in a vicinity of the position where an object to serve as the operated object is changed from the second object to the first object, until a predetermined condition associated with, at least, a distance between the first object and the second object is satisfied after an object to serve as the operated object is changed from the second object to the first object; and control the second object using the first control method, that includes arranging the second object at the predetermined position in the virtual space, after the predetermined condition is satisfied.

18. An information processing system, comprising:

a processor; and a memory configured to store computer readable instructions that, when executed by the processor, causes the information processing system to:

receive input by a player;

change an object to serve as an operated object between a first object and a second object among objects in a virtual space being operated in response to the input;

control the second object using a first control method while the second object does not serve as the operated object, the first control method includes control to arrange the second object at a predetermined position in the virtual space;

control the second object using a second control method, that includes arranging the second object at a position of the second object or in a vicinity of the position where an object to serve as the operated object is changed from the second object to the first object, until a predetermined condition associated with, at least, a distance between the first object and the second object is satisfied after an object to serve as the operated object is changed from the second object to the first object; and control the second object using the first control method, that includes arranging the second object at the predetermined position in the virtual space, after the predetermined condition is satisfied.

19. An information processing method, comprising:

controlling a first object in accordance with input received from a player with the first object among objects in a virtual space as an operated object and controlling a second object among the objects in the virtual space using a first control method, the first control method includes control to arrange the second object at a predetermined position in the virtual space;

changing an object to serve as the operated object from the first object to the second object;

changing the object to be assigned as the operated object from the second object to the first object after the changing of the object to serve as the operated object;

controlling the first object in accordance with input received from a player with the first object as the operated object during a period until a predetermined condition associated with, at least, a distance between the first object and the second object is satisfied after the changing of the object to be assigned as the operated object and controlling the second object using a second control method that includes arranging the second object at a position of the second object or in a vicinity of the position where an object to serve as the operated object is changed from the second object to the first object; and controlling the second object using the first control method, that includes arranging the second object at the predetermined position in the virtual space, after the predetermined condition is satisfied.

* * * * *